US012038944B2

(12) United States Patent
Buchmann et al.

(10) Patent No.: US 12,038,944 B2
(45) Date of Patent: Jul. 16, 2024

(54) PROPAGATION OF EXTENSIONS OF DATA ARTIFACTS

(71) Applicant: SAP SE, Walldorf (DE)

(72) Inventors: Daniel Buchmann, Karlsruhe (DE); Andreas Balzar, Bad Schoenborn (DE); Laurent Pommier, Antony (FR)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 17/714,007

(22) Filed: Apr. 5, 2022

(65) Prior Publication Data
US 2023/0315751 A1    Oct. 5, 2023

(51) Int. Cl.
*G06F 16/27*    (2019.01)
(52) U.S. Cl.
CPC .................. *G06F 16/27* (2019.01)
(58) Field of Classification Search
CPC .............................. G06F 16/27; G06F 16/213
USPC ........................................................ 707/624
See application file for complete search history.

(56) References Cited

U.S. PATENT DOCUMENTS

| | | | |
|---|---|---|---|
| 11,561,976 B1* | 1/2023 | Buchmann | G06F 16/214 |
| 2014/0137079 A1* | 5/2014 | Witteborg | G06F 8/71 |
| | | | 717/120 |
| 2019/0005074 A1* | 1/2019 | Bregler | G06F 16/9024 |
| 2020/0334034 A1* | 10/2020 | Bestfleisch | G06F 9/44526 |
| 2021/0374146 A1* | 12/2021 | Hrastnik | G06F 16/24573 |

OTHER PUBLICATIONS

Extended European Search Report received in European Patent Application No. 23164864.3, Sep. 5, 2023, 9 pages.

\* cited by examiner

*Primary Examiner* — Michael Pham
(74) *Attorney, Agent, or Firm* — Klarquist Sparkman, LLP

(57) ABSTRACT

Techniques and solutions are described for propagating extensions to data artifacts, such as data artifacts defining objects in a physical or virtual data model. One or more data artifacts are identified that are related to a first data artifact. One or more extension elements of the first data artifact are analyzed for propagation to at least one data artifact of the one or more data artifacts. Analyzing whether an extension element should be propagated can include analyzing a type of the extension element, a type of operation or context in which the extension element is used, or how the at least one data artifact refers to, uses, or incorporates the first data artifact, including particular elements thereof. The results of the analysis are compared with various rules. Extension elements are propagated automatically, manually upon user approval (e.g., propagation recommendations are provided), or in a semi-automated manner.

20 Claims, 24 Drawing Sheets

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder                  ─── 804
  as select from    vbak                        ─── 812
       ─── 816    ─── 816
  left outer to one join vbkd on  vbak.vbeln = vbkd.vbeln
                              and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency   ─── 820
    on $projection.TransactionCurrency = _TransactionCurrency.Currency
  association [0..1] to I_SampleCustomer         as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]     //Composition
  _Item,
  vbak.vkorg                                    as SalesOrganization,
  vbak.auart                                    as SalesOrderType,
  vbak.vtweg                                    as DistributionChannel,
  @ObjectModel.foreignKey.association: '_SoldToParty'
  vbak.kunnr                                    as SoldToParty,
  _SoldToParty,                                         ─── 824
  @DefaultAggregation: #SUM
  @Semantics.amount.currencyCode: 'TransactionCurrency'
  vbak.netwr                                    as TotalNetAmount,
  @Semantics.currencyCode: true
  @ObjectModel.foreignKey.association: '_TransactionCurrency'
  vbak.waerk                                    as TransactionCurrency,
  _TransactionCurrency,
  ...
}                ─── 828
where vbak.vbtyp = 'C';
```

FIG. 8

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'   904
@Analytics.dataCategory: #DIMENSION
@AccessControl.authorizationCheck: #CHECK
@Metadata.allowExtensions: true
@Search.searchable: true
define view I_SampleSalesOrder
  as select from           vbak
    left outer to one join vbkd on  vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer       as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]    //Composition
  _Item,
  vbak.vkorg                                   as SalesOrganization,
  vbak.auart                                   as SalesOrderType,
  vbak.vtweg                                   as DistributionChannel,
  @ObjectModel.foreignKey.association: '_SoldToParty'
  vbak.kunnr                                   as SoldToParty,
  _SoldToParty,
  @DefaultAggregation: #SUM
  @Semantics.amount.currencyCode: 'TransactionCurrency'
  vbak.netwr                                   as TotalNetAmount,
  @Semantics.currencyCode: true
  @ObjectModel.foreignKey.association: '_TransactionCurrency'
  vbak.waerk                                   as TransactionCurrency,
  _TransactionCurrency,
  ...
}
where vbak.vbtyp = 'C';
```

908 →
```
@EndUserText.label: 'Auto assigned role for I_SampleSalesOrder'
@MappingRole: true
define role I_SampleSalesOrder {
  grant select on I_SampleSalesOrder
  where ( SalesOrderType ) =
  aspect pfcg_auth ( v_vbak_aat,
                     auart,
                     actvt = '03' );
}
```

912 →
```
@Metadata.layer: #CORE
annotate view I_SampleSalesOrder
with
{
  @UI.lineItem: [{importance: #HIGH }]
  SalesOrder;
  @UI.lineItem: [{importance: #HIGH }]
  SalesOrderType;
}
```

916 →
```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```

FIG. 9

Select Statements 1304

| Object Type | Object Name | Object VersionID | EntityName | PrimaryData SourceName | PrimaryData SourceType | WhereCondition CollectionID | JoinCondition CollectionID | ... |
|---|---|---|---|---|---|---|---|---|
| DDLS | DDLS1 | 56 | VIEW1 | TABLE1 | TABLE | | | |
| DDLS | DDLS2 | 77 | VIEW2 | TABLE2 | TABLE | | | |
| DDLS | DDLS3 | 88 | VIEW3 | TABLE3 | TABLE | | 1 | |
| DDLS | DDLS4 | 255 | VIEW4 | VIEW1 | VIEW | 1 | | |

Association Definition 1384

| Object Type | Object Name | Object VersionID | Entity Name | Association Name | Association OriginalName | Target Entity Name | Target Entity Type | Target Minimum Cardinality | Target Maximum Cardinality | OnCondition CollectionID | ... |
|---|---|---|---|---|---|---|---|---|---|---|---|
| DDLS | DDLS2 | 77 | VIEW2 | _V2 | _V2 | VIEW3 | VIEW | 0 | 1 | 1 | |

Conditions 1332

| Object Type | Object Name | Object VersionID | Condition Collection ID | Group ID | Grouping Ordinal Number | Grouping Operator | Left Group ID | Left Data Source Name | Left Field Name | Left Value | LeftToRight Relation | Right Group ID | Right Data Source Name | Right Field Name | Right Value | ... |
|---|---|---|---|---|---|---|---|---|---|---|---|---|---|---|---|---|
| DDLS | DDLS4 | 255 | 1 | 1 | | | | VIEW1 | | | LEFT_OUTER_JOIN | 2 | | | | |
| DDLS | DDLS4 | 255 | 1 | 2 | 1 | | | VIEW2 | FIELD2 | | EQUAL | | VIEW1 | FIELD2 | | |
| DDLS | DDLS4 | 255 | 1 | 2 | 2 | AND | | TABLE3 | FIELD4 | | NOT_EQUAL | | | | REL | |
| DDLS | DDLS3 | 88 | 1 | | 1 | | | VIEW2 | FIELD3 | | EQUAL | | VIEW3 | VIEW3 | x | |
| DDLS | DDLS2 | 77 | | | | | | | | | | | | | | |

FIG. 13

DDLS2

```
define view View2                          1404
  as select from View1
{                           1420
  key View1.Field1 as AliasedField1,
  case View1.Field2
    when 'VAL1' then 'X'
    when 'VAL2' then 'Y'
    else 'Z'           1422
  end as CalculatedField2,              1424
  concat( View1.Field1, View1.Field2) as CalculatedField3,
  cast( View1.Field3 as DE4 preserving type ) as CalculatedField4
}                                                        1426
```

DDLS1

```
                         1408
  define view View1
    as select from Table1
  {                    1430
    key Table1.Field1,
        Table1.Field2,
        Table1.Field3  1432
  }       1434
```

TABLE1

```
                       1412
  define table Table1
  {         1440
    key Field1 : DE1 not null;
       Field2 : DE2;
  1442 Field3 : DE3;
  }      1444
```

FIG. 14

| Object Type | Object Name | Object Version ID | Entity Name | Field Name | Field Original Name | Base Entity Name | Base Entity Type | Base Field Name | Base Expression ID | IsKey Field | Data Element | Data Type | Data Type Length |
|---|---|---|---|---|---|---|---|---|---|---|---|---|---|
| DDLS | DDLS1 | 13 | VIEW1 | FIELD1 | Field1 | TABLE1 | TABL | FIELD1 | | TRUE | DE1 | CHAR | 30 |
| DDLS | DDLS1 | 13 | VIEW1 | FIELD2 | Field2 | TABLE1 | TABL | FIELD2 | | | DE2 | CHAR | 10 |
| DDLS | DDLS1 | 13 | VIEW1 | FIELD3 | Field3 | TABLE1 | TABL | FIELD3 | | | DE3 | CHAR | 20 |
| DDLS | DDLS2 | 65 | VIEW2 | ALIASEDFIELD1 | AliasedField1 | VIEW1 | VIEW | FIELD1 | | TRUE | DE1 | CHAR | 30 |
| DDLS | DDLS2 | 65 | VIEW2 | CALCULATEDFIELD2 | CalculatedField2 | | | | 1 | | | CHAR | 4 |
| DDLS | DDLS2 | 65 | VIEW2 | CALCULATEDFIELD3 | CalculatedField3 | | | | 2 | | | CHAR | 40 |
| DDLS | DDLS2 | 65 | VIEW2 | CALCULATEDFIELD4 | CalculatedField4 | VIEW1 | VIEW | FIELD3 | | | DE4 | CHAR | 20 |
| TABL | TABLE1 | 24 | TABLE1 | FIELD1 | | | | | | TRUE | DE1 | CHAR | 30 |
| TABL | TABLE1 | 24 | TABLE1 | FIELD2 | | | | | | | DE2 | CHAR | 10 |
| TABL | TABLE1 | 24 | TABLE1 | FIELD3 | | | | | | | DE3 | CHAR | 20 |

| Data Type Decimals | Field Definition StartLine | Field Definition StartColumn | Field Definition EndLine | Field Definition EndColumn |
|---|---|---|---|---|
| ... | ... | ... | ... | ... |
| | 4 | 2 | 4 | 35 |
| | 5 | 2 | 9 | 25 |
| | 10 | 2 | 10 | 57 |
| | 11 | 2 | 11 | 65 |
| ... | ... | ... | ... | ... |

FIG. 15

| Object Type | Object Name | Object Version ID | Entity Name | SubEntity Name | Annotation InternalID | Annotation Name | Parent Annotation InternalID | AnnotationValue | Effective AnnotationValue |
|---|---|---|---|---|---|---|---|---|---|
| DDLS | DDLS2 | 312 | VIEW2 | KEYFIELD | 1 | ENDUSERTEXT | | | |
| DDLS | DDLS2 | 312 | VIEW2 | KEYFIELD | 2 | ENDUSERTEXT.LABEL | 1 | View2: Label text in English | LOCALIZED_TEXT:456 |
| DDLS | DDLS1 | 217 | VIEW1 | KEYFIELD | 1 | ENDUSERTEXT | | | |
| DDLS | DDLS1 | 217 | VIEW1 | KEYFIELD | 2 | ENDUSERTEXT.LABEL | 1 | View1: Label text in English | LOCALIZED_TEXT:135 |
| DDLS | DDLS1 | 217 | VIEW1 | KEYFIELD | 3 | ENDUSERTEXT.QUICKINFO | 1 | View1: Quickinfo text in English | LOCALIZED_TEXT:249 |
| DDLX | DDLX2 | 672 | VIEW2 | KEYFIELD | 1 | SEARCH | | | |
| DDLX | DDLX2 | 672 | VIEW2 | KEYFIELD | 2 | SEARCH.DEFAULTSEARCHELEMENT | 1 | | TRUE |

| TextID | Language Code | Text |
|---|---|---|
| 135 | EN | View1: Label text in English |
| 135 | DE | View1: Bezeichnertext in Deutsch |
| 456 | EN | View2: Label text in English |
| 456 | DE | View2: Bezeichnertext in Deutsch |
| 249 | EN | View1: Quickinfo text in English |
| 249 | DE | View1: Schnellinfotext in Deutsch |

FIG. 17

ObjectVersionSource 2012

| ObjectType | ObjectName | ObjectVersionId | ... |
|---|---|---|---|
| DDLS | I_CUSTOMER | 1 | ... |
| DDLS | I_CUSTOMER | 2 | ... |
| DDLS | I_CUSTOMER | 3 | ... |
| DDLS | I_CUSTOMER | 4 | ... |
| DDLS | I_CUSTOMER | 5 | ... |
| DDLS | I_SALESORDER | 1 | ... |
| DDLS | I_SALESORDER | 2 | ... |
| DDLS | I_SALESORDER | 3 | ... |
| DDLS | I_SALESORDERITEM | 1 | ... |

DdlsVersion

| DdlsName | DdlsVersionID | CdsEntityName | CdsEntityOriginalName | ... |
|---|---|---|---|---|
| I_CUSTOMER | 1 | I_CUSTOMER | I_Customer | ... |
| I_CUSTOMER | 2 | I_CUSTOMER | I_Customer | ... |
| I_CUSTOMER | 3 | I_CUSTOMER | I_Customer | ... |
| I_CUSTOMER | 4 | I_CUSTOMER | I_Customer | ... |
| I_CUSTOMER | 5 | I_CUSTOMER | I_Customer | ... |
| I_SALESORDER | 1 | I_SALESORDER | I_SalesOrder | ... |
| I_SALESORDER | 2 | I_SALESORDER | I_SalesOrder | ... |
| I_SALESORDER | 3 | I_SALESORDER | I_SalesOrder | ... |
| I_SALESORDERITEM | 1 | I_SALESORDERITEM | I_SalesOrderItem | ... |

FIG. 20

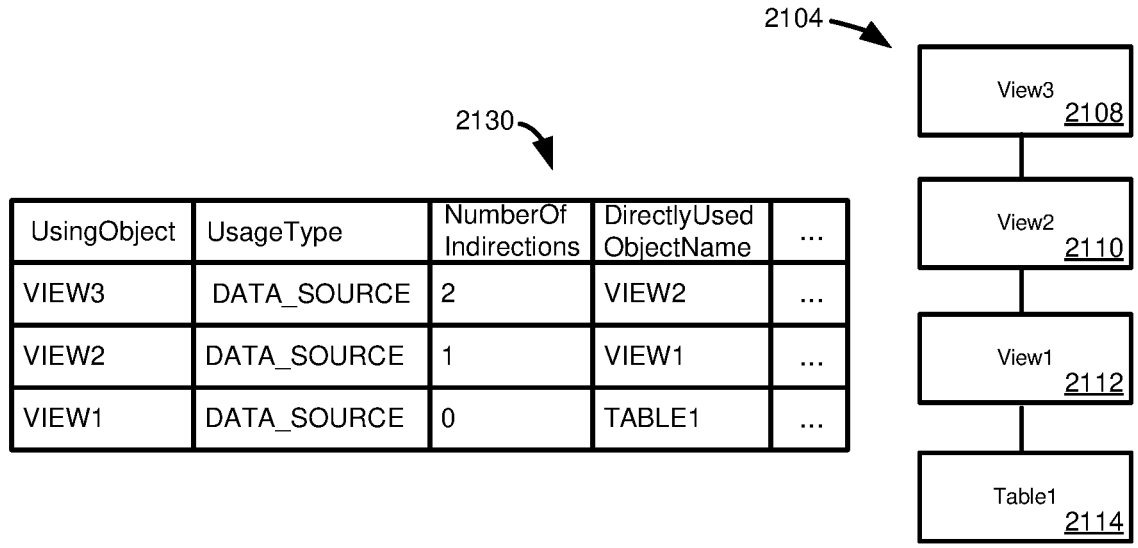

FIG. 21

```
<Annotations xmlns="http://docs.oasis-open.org/odata/ns/edm" Target=".../FieldName">
  <Annotation Term="Common.ValueList">
    <Record>
      <PropertyValue String="FieldName" Property="Label"/>
      <PropertyValue String="Field" Property="CollectionPath"/>
      <PropertyValue Property="SearchSupported" Bool="true"/>
      <PropertyValue Property="Parameters">
        <Collection>
          <Record Type="Common.ValueListParameterInOut">
            <PropertyValue Property="LocalDataProperty" PropertyPath="FieldName"/>
            <PropertyValue String="FieldName" Property="ValueListProperty"/>
          </Record>
          <Record Type="Common.ValueListParameterDisplayOnly">
            ...
          </Record>
          ...
        </Collection>
      </PropertyValue>
    </Record>
  </Annotation>
</Annotations>
```

FIG. 22

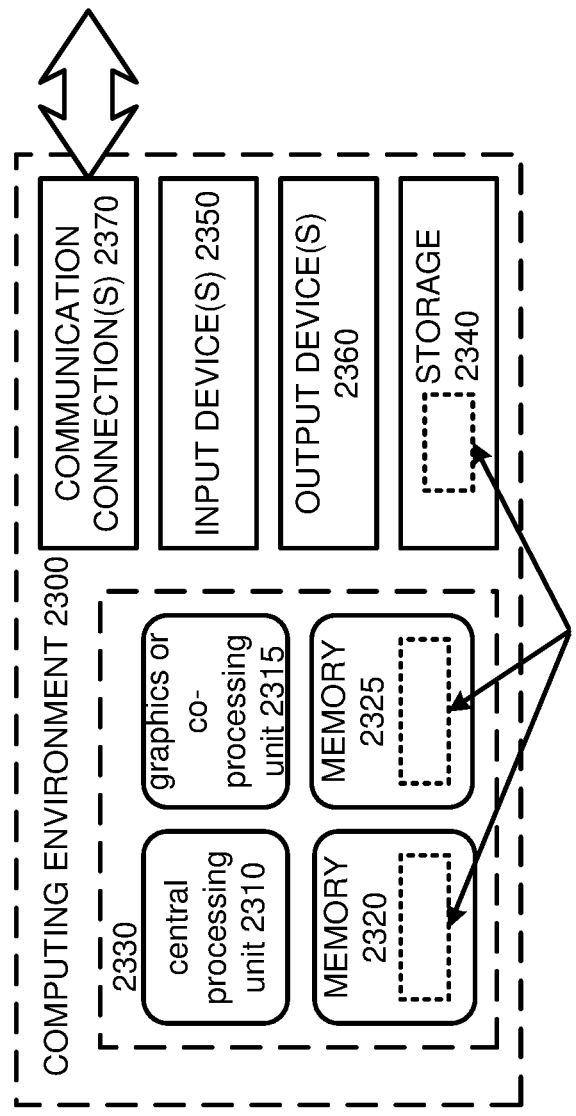

PROPAGATION OF EXTENSIONS OF DATA ARTIFACTS

FIELD

The present disclosure generally relates to data artifacts, for example database artifacts, such as table, views, or OLAP cubes, or artifacts that may be mapped to such database artifacts, such as artifacts in a virtual data model. Particular implementations relate to determining whether an extension to a particular artifact should be propagated to other artifacts, such as artifacts that incorporate or refer to an extended artifact.

BACKGROUND

Data stores, such as databases, and interfaces thereto, for many types of uses can be very complex. For example, a physical or virtual model for a data source can have large number of data artifacts, such as data artifacts representing tables and views. Data artifacts, such as views, often build on other data artifacts, and the interrelationships between data artifacts can be very intricate.

In modern software applications, it is common to have a semantic layer that sits between the tables and views at the physical database level and applications that use the data in such tables and views. In some cases, this semantic layer can be implemented as a virtual data model. Artifacts at the virtual data model can be related to artifacts in the physical database. An advantage of the virtual data model is that it can be used to express or describe data artifacts in a more user-friendly way, and to include information beyond what might be storable in the database. A virtual data model can also facilitate using the same physical database artifacts in multiple ways, each tailored to a specific use case.

It is also common for artifacts associated with a database, either in the database itself or in a virtual data model, to be used in multiple ways. For example, a software provider may provide a standard set of tables, views, and other artifacts, including artifacts in a virtual data model. Users of the software may then customize the artifacts for their particular use cases. Customizations can take a variety of forms, including actions such as adding a column to a database table or changing text that is displayed to a user describing a column.

As a more specific example, a software company may provide a database schema that is used in human resource management. Tables and views in the schema may include columns related to "employees." Once vaccines became available during the COVID-19 pandemic that began in 2019, an employer might wish to modify information about employees with a column indicating whether an employee was vaccinated or not, or including dates of immunization and types of immunization (e.g., vaccine manufacturer) delivered.

Because of the complexity of large-scale software development, a software company might eventually update their schema to support such information. However, in the interim particular users of the software might choose to modify, or extend, the relevant artifacts to support the desired information.

Yet another issue that can arise is that users will sometimes use multiple database platforms. For instance, an entity using a particular software solution might have both an on-premise database system and a database system available on a cloud (hyperscalar) computing system. The ability of an entity to modify data artifacts on different systems may not be the same. Even if the entity is fully able to access and modify the appropriate artifacts, it can be tedious and error prone to manually replicate extensions from one system to another system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for propagating extensions to data artifacts, such as data artifacts defining objects in a physical or virtual data model. One or more data artifacts are identified that are related to a first data artifact. One or more extension elements of the first data artifact are analyzed for propagation to at least one data artifact of the one or more data artifacts. Analyzing whether an extension element should be propagated can include analyzing a type of the extension element, a type of operation or context in which the extension element is used, or how the at least one data artifact refers to, uses, or incorporates the first data artifact, including particular elements thereof. The results of the analysis are compared with various rules. Extension elements are propagated automatically, manually upon user approval (e.g., propagation recommendations are provided), or in a semi-automated manner.

In one aspect, a method is provided for propagating extension elements. A first data artifact is received. The first data artifact includes a plurality of base elements and an extension that includes at least a first extension element. At least a second data artifact is determined that is related to the first data artifact. The at least a first extension element is analyzed for propagation to the second data artifact. It is determined that the at least a first extension should be propagated to the second data artifact. The at least a first extension artifact is propagated to the second data artifact.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 8 is code for an example artifact definition for a database view.

FIG. 9 is code for an example artifact definition for a database view, and for artifact definitions which modify or refer to such example artifact definition.

FIG. 13 provides example database tables illustrating how artifact definition information presented in FIG. 13 can be stored in a relational format.

FIG. 14 is a schematic diagram illustrating how artifact definitions can have fields that are defined with respect to other artifact definitions.

FIG. 15 provides an example database table illustrating how artifact definition information presented in FIG. 14 can be stored in a relational format.

FIGS. 17 and 18 provide example database tables illustrating how artifact definition information presented in FIG. 16 can be stored in a relational format.

FIGS. 20 and 21 present example tables that can be used to carry out operations requested through a data access service that provides access to artifact definitions and extensions thereto.

FIG. 22 presents example code that can be used to annotate a user interface service displaying artifact definition information.

FIG. 23 is a diagram of an example computing system in which some described embodiments can be implemented.

DETAILED DESCRIPTION

Example 1—Overview

Figure 1:
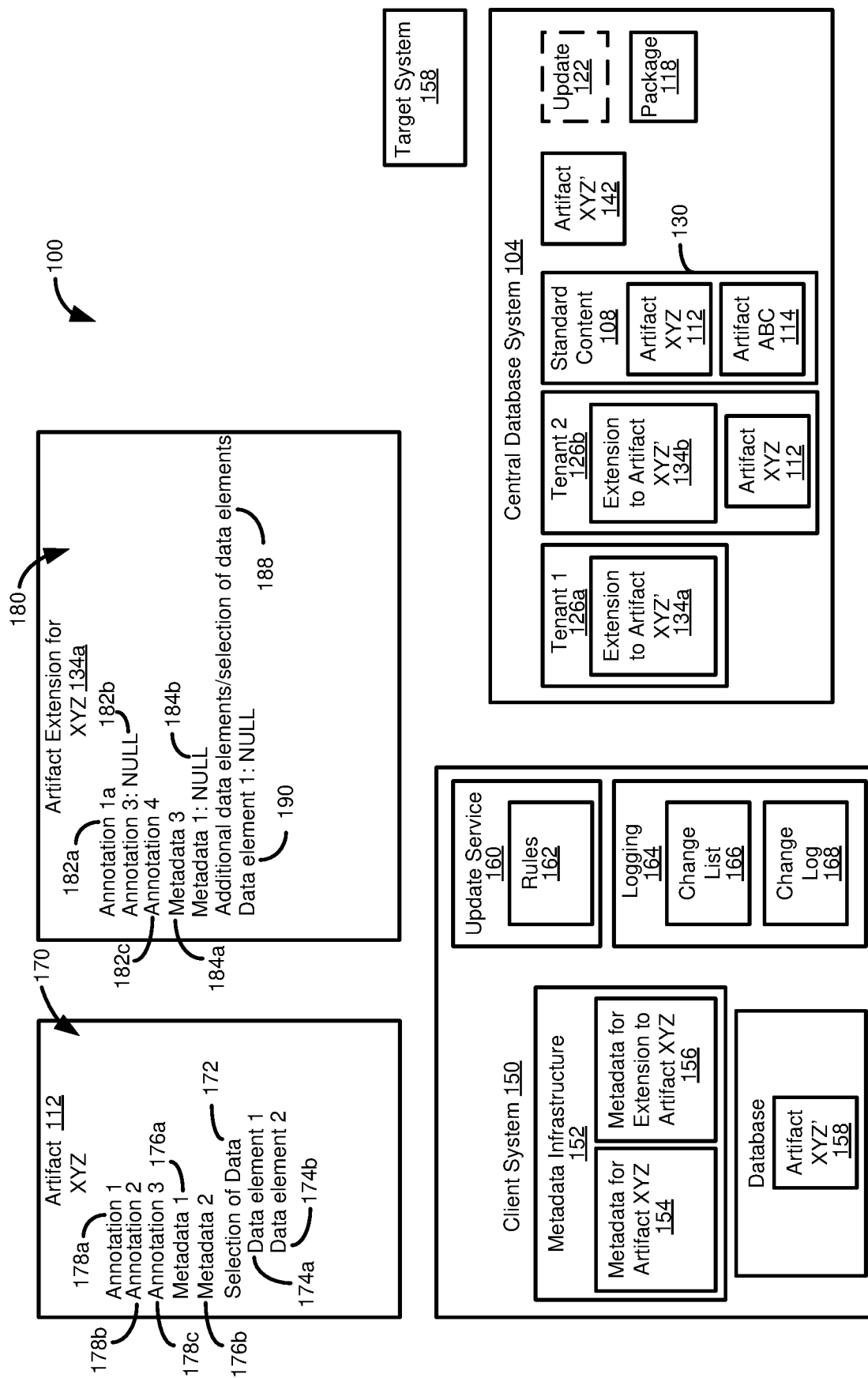
FIG. 1 is a diagram illustrating an example computing environment in which disclosed techniques can be implemented, where a source system provides an artifact exposure service that can be accessed by a target system, and where one or more computing system can store different versions of data artifacts, including data artifacts that are extended as compared with other data artifacts.

Data stores, such as databases, and interfaces thereto, for many types of uses can be very complex. For example, a physical or virtual model for a data source can have large number of data artifacts, such as data artifacts representing tables and views. Data artifacts, such as views, often build on other data artifacts, and the interrelationships between data artifacts can be very intricate.

In modern software applications, it is common to have a semantic layer that sits between the tables and views at the physical database level and applications that use the data in such tables and views. In some cases, this semantic layer can be implemented as a virtual data model. Artifacts at the virtual data model can be related to artifacts in the physical database. An advantage of the virtual data model is that it can be used to express or describe data artifacts in a more user-friendly way, and to include information beyond what might be storable in the database. A virtual data model can also facilitate using the same physical database artifacts in multiple ways, each tailored to a specific use case.

It is also common for artifacts associated with a database, either in the database itself or in a virtual data model, to be used in multiple ways. For example, a software provider may provide a standard set of tables, views, and other artifacts, including artifacts in a virtual data model. Users of the software may then customize the artifacts for their particular use cases. Customizations can take a variety of forms, including actions such as adding a column to a database table or changing text that is displayed to a user describing a column.

As a more specific example, a software company may provide a database schema that is used in human resource management. Tables and views in the schema may include columns related to "employees." Once vaccines became available during the COVID-19 pandemic that began in 2019, an employer might wish to modify information about employees with a column indicating whether an employee was vaccinated or not, or including dates of immunization and types of immunization (e.g., vaccine manufacturer) delivered.

Because of the complexity of large-scale software development, a software company might eventually update their schema to support such information. However, in the interim particular users of the software might choose to modify, or extend, the relevant artifacts to support the desired information.

Yet another issue that can arise is that users will sometimes use multiple database platforms. For instance, an entity using a particular software solution might have both an on premise database system and a database system available on a cloud (hyperscalar) computing system. The ability of an entity to modify data artifacts on different systems may not be the same. Even if the entity is fully able to access and modify the appropriate artifacts, it can be tedious and error prone to manually replicate extensions from one system to another system. Accordingly, room for improvement exists.

The present disclosure provides techniques that can be used to propagate extensions to data artifacts made in one environment to another environment. The environments may be on common computing infrastructure or on different computing infrastructures. In a particular example, extensions made at an on-premise system are propagated to a cloud (or hyperscalar) system, which can be a hosted system.

As used herein, "propagated" is at least primarily intended to refer to a process of making, or evaluating whether to make, extensions to artifacts, as opposed to the process of sending the extensions between environments (or systems, where the terms can be used interchangeable to the extent different computing infrastructures, or systems, are not required). In other words, "propagation" refers to a process of applying extensions from one data artifact to one or more other data artifacts, where the other data artifacts can be on the same system or on different systems, and where at least in some cases extensions are propagated from a data artifact to data artifacts that have a hierarchical relationship with a data artifact for which an extension is being propagated.

The present disclosure is not limited to any particular means of having extensions available at a system where they are applied or evaluated to determine whether they should, or can, be applied. For example, the extensions can be transferred over a network or using a computer-readable storage medium (e.g., disk), either in their native format, a serialized format (for example, a standardized/transport/ exchange format, such as CSN, JSON, or XML), or some other format. CSN (Core Schema Notation), or CSON (Core Schema Object Notation), both used in software available from SAP, SE, of Walldorf, Germany, can be considered as SQL statements enriched with annotations or semantic information. Similar data artifacts can be defined using JSON, XML, or other formats.

In a particular example, extensions, which can be a form of metadata, can be transferred using an exposure service at the source system (the system where extensions are being transferred from), including as disclosed in U.S. patent application Ser. No. 17/448,514, filed Sep. 22, 2021, and entitled "IDENTIFICATION AND IMPORT OF META-DATA FOR EXTENSIONS TO DATABASE ARTI-FACTS," incorporated herein in its entirety to the extent not inconsistent with the present disclosure. Extensions, in particular implementations, can be extensions as implemented in software available from SAP SE, of Walldorf, Germany, such as extensions to objects/artifacts expressed in ABAP or CSN (including for CDS, Core Data Services, data artifacts, such as CDS views).

As indicated above, it may be desirable to evaluate whether extensions should be applied to a data artifact. Particularly when software automatically recreates or applies extensions, it can be difficult to determine whether a user of the data artifact might want that action to be taken. The situation can become particularly complex when extensions by multiple parties may conflict or overlap. For example, a software company providing a "base" data artifact may also have extensions that are expected to be applied, such as in particular use cases. These extensions can potentially overlap or conflict with extensions made by a party using the company's software.

Thus, "rules" can be developed to evaluate whether particular extensions, such as particular types of extensions, from one data artifact should be applied to other, related (or target) data artifacts. The rules can be comparatively simple, such as that all extensions of a particular type will, or will not, be propagated. Or, rules can be more complex, such as evaluating the details of a particular extension to determine if the extension should be propagated to related data artifacts. While the application of rules can be automatic in some cases, in other cases the results of the rules can be presented to a user or process to determine whether or not particular extensions are to be propagated. Prompting for a decision on whether an extension should be propagated can be particularly useful when a particular rule, or the application of a particular rule, does not provide a clear answer.

A specific scenario in which disclosed innovations can prove useful is when extensions for a user (entity) are made on a first system, such as an on-premise system, and are being evaluated for propagation in a second system, such as a cloud-based system, where the user's access or permissions differ between the systems. The difference in the user's access or permissions can be due to security concerns, or because functionality to allow users to access or modify particular data artifacts has not yet been implemented.

As mentioned, data artifacts, including extensions, can be located at different "layers" of a schema (e.g., a database schema or a schema for a virtual data model), where artifacts at lower layers, or levels, serve as building blocks for higher levels, and where artifacts at those higher levels can serve as building blocks for artifacts at yet higher levels. It may be that in a source system, a user has access to all layers, or at least a larger number of layers, than at a target system where extensions are to be propagated. Or, regardless of a number of layers to which a user might have access, a user may have the ability to extend artifacts at the source system at lower levels than at a target system. Thus, a problem can arise where a user has extended an object at the source system but is not able to manually make the extension at the target system. In fact, if the user does not have access to lower levels of a "stack" of data artifacts (for example, a stack of views in a virtual data model that build on one another), the user may not even be able to "see" an extension in order to manually include the extension in higher levels of the stack to which they do have access. Thus, "propagation" as used herein can include extending higher level artifacts with extensions from lower-level artifacts, such as from a lowest level at which an extension element appears to the top of the stack, or at least to a level to which the user has access (which, in some cases, can be the lowest layer of the stack to which the user has access).

Even if the user can access sufficient layers of the stack to "see" an extension, it can be time consuming, tedious, and error prone for a user to manually propagate an extension from a lower stack level to a higher stack level. Accordingly, disclosed techniques can include automated or semi-automated functionality to propagate extensions, such as using a "wizard," regardless of whether the user may have access to some of the levels analyzed by the wizard.

In some aspects, a service at the source system facilitates retrieval of information related to data artifacts, or extensions thereto, by a target system, or by an intermediate system on behalf of the target system. The service at the source system can include a converter that converts definitional information in the source system for data artifacts into a common format used to facilitate sharing of content between systems.

Examples 2-6 describe techniques for propagating extension to (or between) data artifacts. Examples 7-16 provide additional details that can be used with the innovations disclosed in Examples 2-6. For instance, as described above, rules (including heuristics) can aid in determining whether a particular propagation should be made or recommended. At least certain rules can be based at least in part on information about a particular extension, or element thereof, such as its datatype, how the extension/element is used, and using semantic information maintained for the extension/element. Thus, sources of these information, such as data dictionaries, can be useful in helping to determine whether an extension should be propagated.

Not all extensions need be treated in the same manner. For example, a set of data artifacts may include user-created data artifacts (e.g., customer-created) and provider-created data artifacts. For user-created data artifacts, it may be inappropriate to propagate extensions that the user to did not choose to include in higher-level artifacts in a source environment. Thus, in some implementations, disclosed propagation techniques are used to propagate extension elements, such as extension elements created by a user, to provider-created data artifacts to at least certain data artifacts that are accessible to the user in a target environment, while this propagation is not carried out for extensions to user-created data artifacts.

Similarly, when extensions are created at different "levels" of a provider (e.g., base software versus specialized software for a particular use case), it may be appropriate to propagate extensions to lower-level artifacts to at least some higher-level artifacts.

Example 2—Example Computing Environment Having Data Artifacts and Extensions Thereto As discussed in Example 1, extensions to data artifacts can come from a number of sources. For instance, a base set of data artifacts can be used in a number of applications, where different applications can have different modifications (extensions) to the base data artifacts, or can have different data artifacts which use (including reference or incorporating elements of) the base data artifacts. For instance, a base set of data artifacts can be defined to store information related to the operation of a business. However, it may be helpful to extend the base artifacts in different ways depending on whether those base data artifacts are used in a production planning software application or in a human resources software application. Similarly, different entities that use the base artifacts, or application-specific artifacts derived therefrom, may benefit from extending those artifacts to better suit their needs. Even individual users or departments within an entity may desire to extend data artifacts to which they have access.

FIG. 1 illustrates a computing environment 100 in which disclosed technologies can be implemented. FIG. 1 can represent a scenario where different users of a database system, such as tenants in a cloud-based database system, have access to standard content, and at least some tenants have extensions to standard, or base, content (for example, data artifacts). However, as described above, the disclosed innovations are not, unless otherwise specified, limiting to any particular use case. Thus, concepts described in conjunction with FIG. 1 can be applied to other use cases. For example, extensions created by a software provider (which can be the same as, or different from, a software provider responsible for creation of the "base" data artifacts being extended) can be evaluated for propagation in different context (e.g., a different application or operating environment, or on a different computing system, such as when a cloud-based system is used with, or in place of, an on-premise system). In addition, although FIG. 1 illustrates a central computing system in communication with a client system, where the central computing system has multiple tenants, more generally the technologies described with respect to FIG. 1 can be implemented using a source environment and a target environment, more generally, unless the discussion is clearly only relevant to different computing systems, or systems having multiple tenants.

The computing environment 100 includes a central database system 104, which can be, in some implementations, a cloud-based database system. The central database system 104 can include standard content 108, such as database artifacts 112, 114, where the database artifacts can be tables or views. The standard content 108 can be content associated, for example, with a specific application or set of applications, and typically all or a large portion of the content is relevant to many clients. The standard content 108 can be installed from a package 118, and can be updated or upgraded using an update 122 (which can also be implemented as a package). For instance, after a standard database schema is installed or upgraded, extensions to such content can be retrieved from a client's database system.

In some cases, clients can modify all or a portion of the standard content 108. In other cases, standard content 108 is protected from client modification, particularly if the standard content is shared by multiple clients, or if modification of the standard content might cause the loss of application functionality. If standard content 108 is not modifiable by a client, it can in some implementations be extended by a client. That is, database artifacts of the standard content 108 may be "locked," but a client may be able to create other database artifacts that add to or alter standard database artifacts.

FIG. 1 shows the computing environment 100 as including tenants 126a, 126b. In some cases, the tenants 126a, 126b access the standard content 108 via a shared container 130, as shown for tenant 126a (where the tenant container is not shown as including the artifacts 112, 114). In other cases, a tenant container can include artifacts of the standard content 108, such as shown for tenant 126b, the container for which includes the artifact 112.

Contains for the tenants 1261, 126b are shown as including extensions 134a, 134b to the artifact 112. An extension 134a, 134b can make various modifications to the artifact 112, such as adding, removing, or changing data or metadata of the artifact. As an example of a change to data, the extension 134a can add a column to a view or table represented by the artifact 112.

By way of example, the artifact 112 may represent data for employees, having fields for a name, a social security number, a job identifier, a rate of pay, etc. Given the COVID-19 pandemic starting in 2019, and with the vaccines introduced in 2020-2021, an employer may wish to track whether employees have been vaccinated or not, a date an employee was vaccinated, etc. For various reasons, it may take time before a flag indicating if an employee is vaccinated is introduced into the artifact 112 via the standard content 108. A client (represented by a tenant 126a, 126b) can include an extension 134a, 134b that adds the vaccinated flag to the artifact 112. In some cases, an artifact used for a particular client or tenant is created based on the standard content 108 and any extensions defined for/by a client. For example, artifact 142 can be created (for instance, using DDL statements) by combining or merging the artifact 112 with the extension 134a or 134b.

In some implementations, data for an extension is imported from a client system 150 and stored in a container for a tenant 126a, 126b, or otherwise in the central database system 104. In other cases, the data is stored in another component of the computing environment 100, or is obtained from the client system 150 as part of an artifact creation process, but is not stored outside of the client system 150.

Data for the extension 134a can be obtained from the relevant client system 150 using an infrastructure 152. The infrastructure 152 can, in a specific example, as described in U.S. patent application Ser. No. 17/448,514, filed Sep. 22, 2021, and entitled IDENTIFICATION AND IMPORT OF METADATA FOR EXTENSIONS TO DATABASE ARTIFACTS, incorporated by reference herein to the extent not inconsistent with the present disclosure.

The client system 150 can include a data artifact definition 154, which can be a definition 170 of the data artifact 112. At least some data artifacts can be produced, or defined, by combining or merging a definition of the data artifact with extensions created for use with that data artifact. That is, for example, the artifact 142 in the central database system can be produced by combining the definition 170 of the data artifact with a definition 180 of an extension 134*a* to the data artifact. Similarly, the definitions 154, 156 can be used in defining other data artifacts, where elements of the base artifact definition 170 or elements of its extension definition 180 are used in defining, at least in part, a related data artifact.

Data artifact definitional information can be retrieved from the client system 150 by the central system 104 or by a target system 158 in communication with the central system (or directly in communication with the client system 150). An update service 160 can be used to determine what data artifact information should be sent to another computing environment, which can include selecting a single data artifact definition or a result of layer multiple data artifact definitions, or by applying extension definitions to a base definition of an extended data artifact.

The update service 160 can apply various rules 162, which can include rules that determine whether extension elements should be propagated, or to determine what a data artifact has been modified or extended, including so it can be determined whether extension elements should be propagated. The client system 150 can include a logging component 164. The logging component 164 can include a log 168, where the log can indicate what extension elements were or were not propagated, or to log any propagation errors that may have been encountered when propagating extension elements. Although shown at the client system 150, extension element propagation can, and often is, performed at a target system, such as in the central database system 104 (or at an intermediate system or environment that is in communication with the central database system, such as a system or environment in which a virtual data model is implemented). In this case, the update service 160, the logging component 164, and the log 168 can be included in the central database system 104 (or intermediate system).

FIG. 1 illustrates an example of standard content 108 and an extension to such standard content, in the form of contents 170 for the artifact 112 and contents 180 for the extension 134*a*. The contents 170 include a selection of data 172, which includes elements 174*a*, 174*b*. The selection of data 172 can be a query, such as a SQL query. The contents 170 can include elements 176*a*, 176*b*, such as elements that provide semantic information about the elements 174*a*, 174*b*. The contents 170 can further comprise annotations 178*a*, 178*b*, 178*c*, where an annotation can indicate properties of the artifact 112 or control the use of the artifact, such as defining whether the artifact is exposed to an end user.

The contents 180 of the extension 134 can add, remove, or alter elements of the contents 170, and can add or modify annotations of the content 170. As shown, the contents 180 include an annotation 182*a* that modifies annotation 178*a*, an annotation 182*b* that sets a value of annotation 178*c* to NULL, and an annotation 182*c* that has been added to the contents 170. Since the annotation 178*b* has not been removed or modified, that annotation will be present as in in the artifact 170 when the artifact is merged with the artifact extension 180.

In at least some cases, elements can be handled in a similar manner as annotations. The artifact extension 180 shows that an element 184*a* has been added to the contents 170, and element 176*a* has been removed by setting the value of the element 176*b* to NULL using element 184*b*. The contents 180 can include additional elements or an additional selection of elements 188, or can remove an element, such as a statement 190 in the contents 180 that sets the value of element 176*a* to NULL.

Example 3—Example Computing Environments Having Differential Client Access

Figure 2:
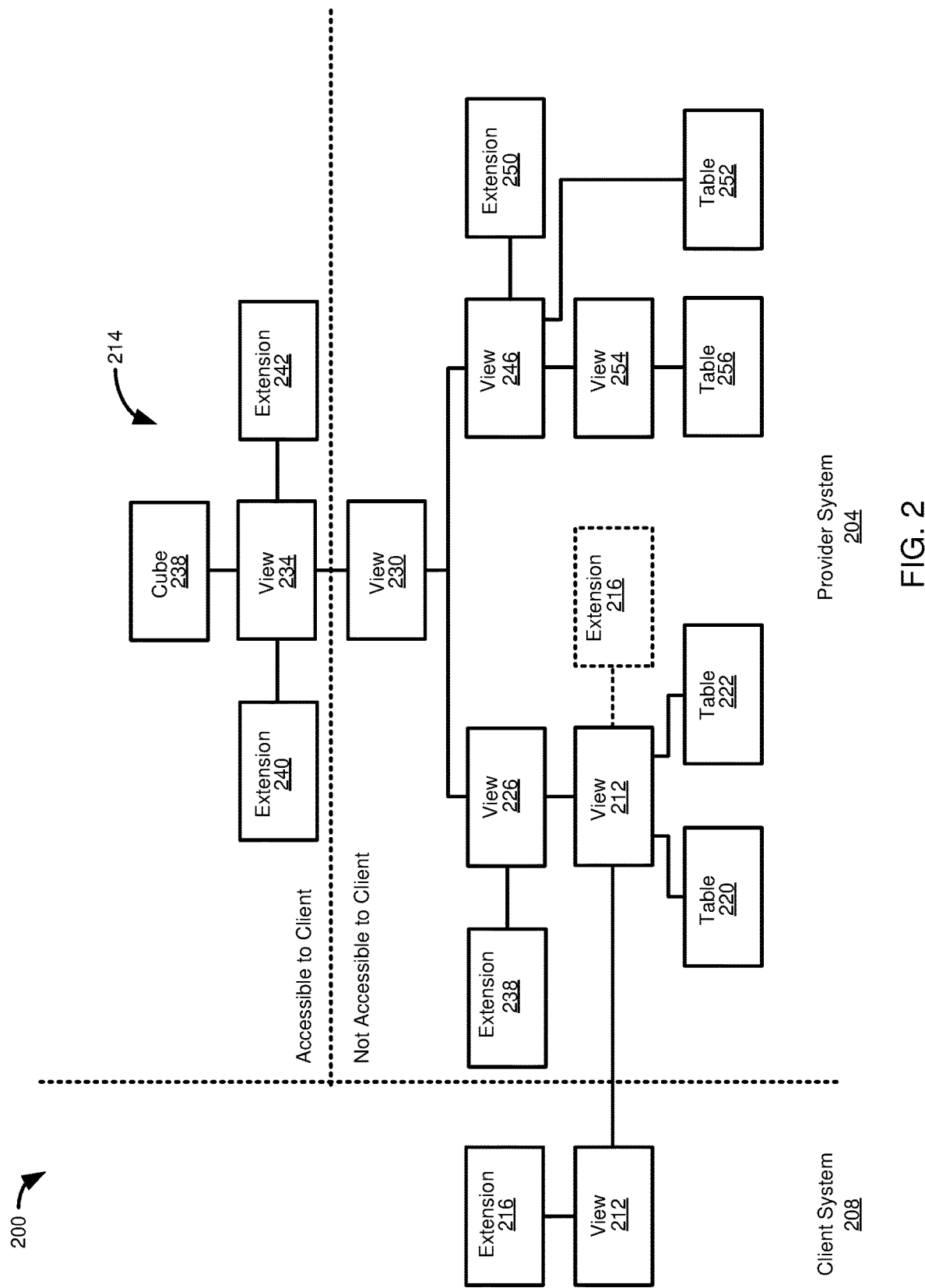
FIG. 2 is diagram illustrating how data artifacts can be hierarchically related, how data artifacts can differ between computing environments, and how access to different levels of a data artifact hierarchy may be restricted for certain users.

FIG. 2 illustrates a particular computing environment 200 for a specific use case for disclosed technologies, but, as with FIG. 1, where technologies implemented for this use case can be applicable to other uses cases where extensions are to be propagated or at least evaluated for propagation. The computing environment 200 further details how data artifacts can be extended, and can be hierarchically related.

The computing environment 200 also illustrates a particular scenario in which disclosed innovations can be useful. In this scenario, an extension 216 for a data artifact, specifically a database view 212, has been created at a client system 208. The view 212 is also available (or will be made available) at a provider system 204. As will be discussed further, the view 212 is referenced by other data artifacts in the provider system 204 (it may also be referenced by, and reference, other data artifacts in the client system 208, although this is not depicted in FIG. 2 for simplicity, but in a particular example, the view 212 can reference, or be referenced by, one or more data artifacts in the client system in an analogous manner as to how the view 212 is used in the provider system 204). However, because of permissions, or because of the architecture of the provider system 208, the client is not able to access the view 212 directly at the client system. To address this issue, disclosed propagation techniques can be used to apply the extension to higher-level data artifacts so that the extension 216 is available at modelling levels at the provider system 204 to which the client does have access.

In the computing environment 200, the view 212 references tables 220, 222 (or, data artifacts representing such tables). For example, the view 212 may select all or a portion of data in the tables 220, 222. Particularly when the view 212 is defined in a virtual data model, the view can have additional information, including information describing how elements of the view should be displayed, how calculations on data from the tables 220, 222 should be performed, or defining how the view can be used, including information useable to determine what users are able to access the view. Because the view 212 is defined with respect to the tables 220, 222, the view can be referred to as being at a higher layer, or level, in a hierarchy of data artifacts 214 than the tables 220, 222.

In a similar manner, the view 212 can be referenced by other data artifacts, including a view 226 at a layer above that of the view 212, at a view 230 at a layer above the view 226, at a view 234 at a layer above the view 230, and by a cube 238 at a layer above the view 230.

One or more of the data artifacts in the computing environment 200 can be associated with extensions. In addition to the extension 216, the views 226, 234 are associated with respective extensions 238, 240, 242. Note that a data artifact can have zero or more extensions, including having a plurality of extensions, as illustrated for the view 234 with its extensions 240, 242. View 230 provides another illustration of how a data artifact can reference multiple other data artifacts, where the view 230 references view 226 and a view 246 (having has an extension 250), as well as table 252. The view 246 in turn references view 254, which references a table 256. In general, a data artifact can reference zero or more other data artifacts, including referencing more than two data artifacts.

FIG. 2 provides a relatively simple data model, or schema, for the purposes of describing disclosed technologies. In practice, data models for enterprise-level use can have thousands of data artifacts, with complex interrelationships. Thus, it can be difficult for users to understand a data model to know what and how extensions should be propagated, even if they are provided access to relevant levels of a data model. Further, propagating extensions can be time consuming, tedious, and error prone, which issues can be addressed by automating or semi-automating a propagation process using disclosed techniques.

Example 4—Example Propagation Process

Figure 3:
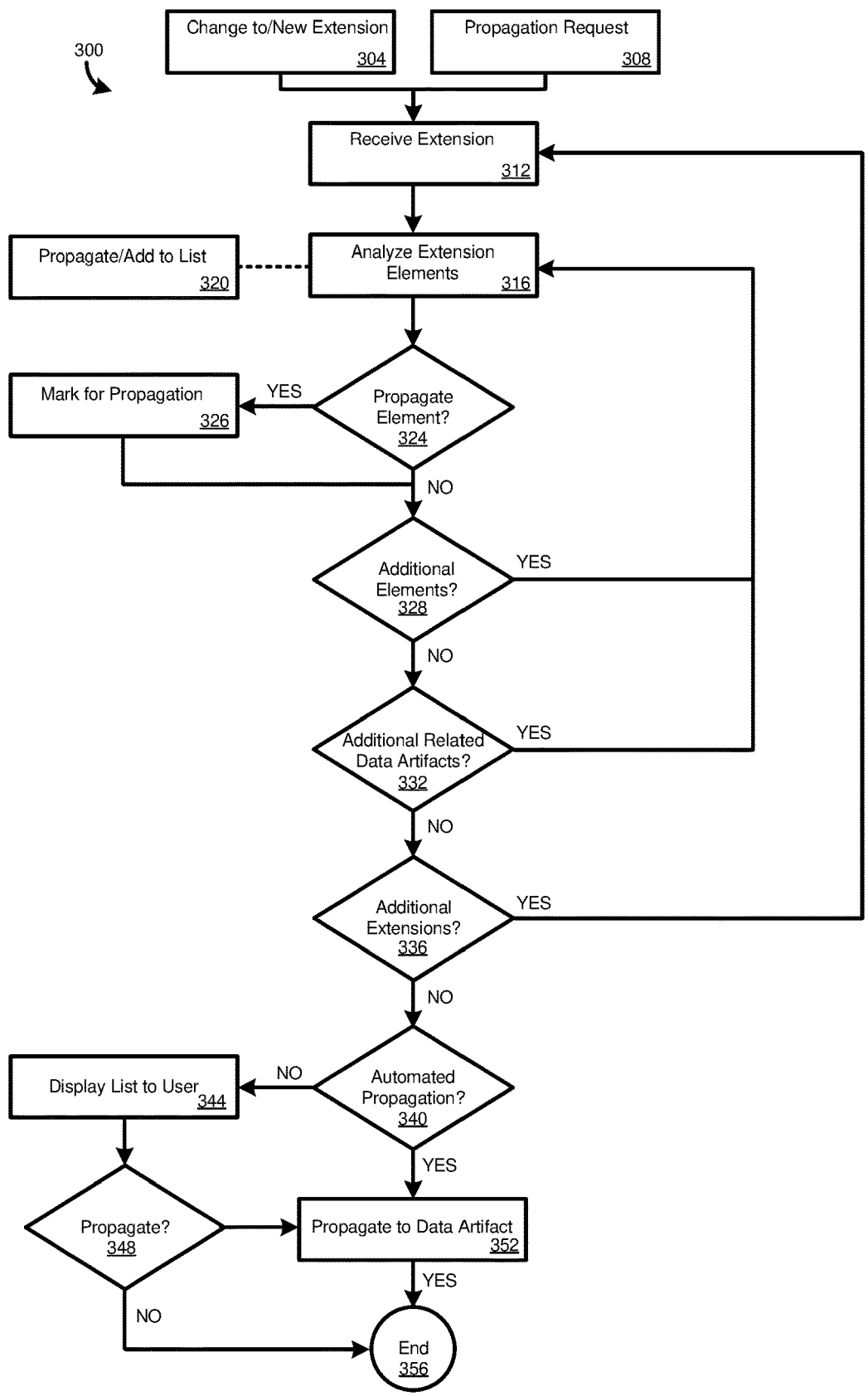
FIG. 3 is a flowchart of a particular implementation of a method of determining extension elements to be propagated or recommend for propagation.

FIG. 3 illustrates a method 300 for propagating extensions to data artifacts, including determining whether a particular extension should be propagated. The method 300 can be implemented in the computing environment 100 of FIG. 1 or the computing environment 200 of FIG. 2. However, more generally, the method 300 can be used between two data artifact hierarchies, where extensions are to be evaluated to be propagated between the hierarchies.

An extension is received for analysis at 312. The extension can be received, for example, in response to a determination of a change to an extension (such as a modification to an extension or a deletion of an extension) at 304 or in response to a propagation request received at 308. Determining a changed or modified extension at 304 can be triggered, in particular implementation, by the receipt of a commit instruction to make a change to an extension or to add an extension. Or, a message containing a modified or new extension can result in the determining at 304.

In yet another example, extensions, such as in a repository, can periodically be analyzed to determine whether an extension has been added or modified. Analyzing a repository can include comparing a timestamp of one data artifact (or extension, such as in an extension artifact, where data artifacts, extensions, and extension artifacts are treated together at least for the purposes of the discussed regarding detecting changes or additions to extension data) with a timestamp of another data artifact. If the timestamps differ, the older data artifact can be considered to have been updated as compared with the new data artifact. Old versions of data artifacts can optionally be maintained, so once it has been determined that a change has occurred, two or more versions of the extension can be compared to determine the nature of one or more changes.

As another technique for determining whether a data artifact has been modified, hash values can also be calculated for data artifacts and stored. Hash values can be periodically recalculated and compared with stored values. If a recalculated value does not match its corresponding stored value, a change to a data artifact can be indicated.

Definitions for updated data artifacts (or extensions) can be retrieved to determine whether an updated artifact contain extensions, and techniques, such as text comparison, can be used to determine the nature of added extension elements. In some cases, a data artifact can be tagged (such as with an annotation) to indicate whether it is extendable. If a data artifact is not extendable, it need not be further considered.

Receiving a propagation request at 308 can include receiving an explicit propagation request from a user or from another computing process. For instance, a user or process, as part of an extension creation or modification process or in association with migrating data artifacts to a different computing system or environment, may request that extensions be propagated (or evaluated for propagation).

Elements of one or more extensions are evaluated at 316. Evaluation at 316 can include determining a type for an extension or an extension element (referred to collectively as "extension elements" for convenience of explanation). Evaluation can also include determining how a particular extension of a particular type is used. As will be further explained, analyzing how an extension is used can help determine whether it would be beneficial to a user (or process) to propagate an extension element. In a particular example, if a data artifact under consideration extensively uses, references, or incorporates an extended data artifact, it may be more likely that an extension from the extended data artifact should be propagated to the data artifact under consideration. Evaluation at 316 can thus involve consulting a set of rules 320.

Based at least in part on the evaluation at 316 and the rules 320, it is determined at 324 whether a given extension element should be propagated to a particular data artifact under consideration (where data artifacts under consideration can be determined based on whether a given data artifact uses, references, or incorporates a data artifact extended by the extension element, either directly or indirectly). If it is determined that the extension element should be propagated, or recommended for propagation, the extension element can be marked for propagation at 326. As will be explained in further detail below, elements marked for propagation can eventually be automatically propagated, if appropriate, or can be presented to a user or process to decide on whether the extension should be propagated.

Marking an extension element for propagation at 326 can include marking the extension element as an element to be automatically propagated or provided for a propagation decision. If it is determined that the extension element should not be propagated (or recommended for propagation), the method 300 proceeds to 328, where it is determined whether an extension contains additional extension elements. If so, the method 300 proceeds to 316 to evaluate another extension element of the extension. If it is determined at 328 that the extension contains no additional extension elements, the method 300 proceeds to 332 where it is determined whether there are additional related data artifacts that should be considered for propagation of the extension elements of an extension being analyzed. If so, the method 300 returns to 316, where extension elements of the extension are evaluated with respect to the next data artifact under consideration.

As has been described, "related data artifacts" can include data artifacts that are related at different levels of a hierarchy, such that higher-level data artifacts build upon-lower-level data artifacts. In some cases, the method 300 can continue for data artifacts up to a highest level in the hierarchy. However, in other cases, the method 300 can terminate earlier for a given extension element. For instance, as described with respect to FIG. 2, in some cases it may be desirable to propagate extension up to a lowest level in a hierarchy where a particular user has access to a data artifact with an extension element. At that point, it can be optionally left to a user to determine whether an extension element should be propagated to yet higher levels. In a yet further embodiment, propagation can be carried out automatically until a particular level in a hierarchy is reached, and propagation to higher levels can be presented as an option to a user, where further propagation can be automatically carried out upon user approval. As will be further described, such as at 340, 344, 352, in addition to scenarios where propagation is carried out in a semi-automated manner, propagation can also be carried out in a fully automated manner where propagation is carried out without user input or in a process that requires user or process approval for any propagation actions (i.e., all propagation analyses is provided in the form of "suggestions').

If it is determined at 332 that no additional data artifacts are to be considered, the method 300 proceeds to 336 where it is determined whether additional extensions are to be evaluated. If so, the method returns to 316, where the elements of the next extension are analyzed. If it is determined at 336 that no more elements, data artifacts, or extensions are to be analyzed, the method 300 proceeds to 340 where it is determined whether some or all of the extension elements are to be automatically propagated.

For any extension elements that are not automatically propagated, the method 300 proceeds to 344, where a list of extension elements, and propagation information, is displayed to a user (or returned to a process which can take actions on behalf of, or in place of, a user). For example, displaying a list of extension elements at 344 can include displaying an identifier of the extension, an identifier of the extension element, an identifier of the originally extended data artifact (optionally with information about the data artifact, such as information in a definition of the data artifact), and identifiers of one or more data artifacts which the user may consider extending with extension elements (optionally with information about such one or more data artifacts, such as information in a definition of the data artifact). Other information may be useful to display at 344, such as a software program where the relevant extension elements/data artifacts are used, user interface screens associated with the extensions/data artifacts, or information about computing systems associated with the extension elements and data artifacts (including, for example, information about a source system or environment for a data artifact or extension or information about a destination (or target) system or environment for a data artifact or extension).

It is determined at 348 whether a user (or process) has selected one or more extension elements (or entire extensions) to be propagated to one or more data artifacts. If so, the method 300 proceeds to propagate the extension elements at 352. Propagating extension elements at 352 includes applying extension elements to a data artifact, where the extension elements can be included in a separate data artifact (e.g., a data artifact representing an extension) that is applied to an extended data artifact or can be included directly in a definition of the extended data artifact. Propagation at 352 can also include transmitting extension elements (and optionally data artifacts) from a source computing system or environment to a destination (or target) computing environment. The method 300 can then end at 356.

If it is determined at 340 that some extension elements are to be automatically propagated, the method 300 can proceed to 352. In some implementations, some extension elements can be automatically propagated, and other extension elements may first be presented to a user for evaluation at 344, while in other implementations all of the extension elements are either automatically propagated or are evaluated by a user. While the method 300 has been described as having some extension elements that are propagated automatically or in response to user selection, cases can exist where no extension elements are identified as suitable for propagation according to the rules 320, in which case the method 300 can end at 356, such as after determining that there are no further extension elements, data artifacts, or extensions to be evaluated prior to 340.

It should be appreciated that various modifications can be made to the method 300, including conducting various operations in an order different from that illustrated in FIG. 3. For example, the method 300 contemplates that all extension elements and data artifacts are analyzed before elements are propagated or recommended for (or against) propagation. However, in other implementations, extension elements can be propagated or recommended for propagation before, or as, other extension elements are analyzed. Similarly, analyzing additional elements, related data artifacts, and additional extensions at 328, 332, 336, respectively, can be carried out in an order different than described. For instance, additional elements or extensions for a particular data artifact can be analyzed before the method 300 proceeds to analyze other data artifacts.

Further, additional actions can be added to the method 300. For example, execution of the method 300 can result in a change log, which can be provided to a user so that a user can understand what propagation actions were (and optionally were not) taken, including so that the user can make further propagations or can rollback (or update) any undesired propagation actions. Similarly, if errors are encountered during propagation, these errors can be logged for review by a user or process.

Changes to extensions can include modifications, additions, or deletions. Deletions can be of two kinds—deletions of elements from an extension or deletion of an entire extension artifact. In the case of deletions of extension elements, with or without addition of another extension element, deletions be handled as a change to an extension, and can be propagated as described above (e.g., deletions are propagated under the same conditions where new elements would be propagated, and where modifications to an existing extension element can be handled in an analogous matter). If an extension element is deleted, and it is the last remaining extension element for an extension artifact (including as might be defined within a data artifact), the entire extension artifact can be deleted, if the extension is maintained as a separate artifact from the artifact which it extends, or an entire extension section can be deleted if included in the definition of the extended artifact.

When artifact information is retrieved from another system, in some cases, what is retrieved is a consolidated view of a data artifact. That is, the data artifact may include a "base" data artifact, one or more extension artifacts, and components that are included through reference to other data artifacts. When the data artifact is retrieved, the components from this collection of artifacts are merged together. When a last extension component is removed, this consolidated data artifact remains, such in its "original," un-extended state. In other cases, the collection of data artifacts is imported, and an extension artifact can be deleted when a last extension component of the extension artifact is removed. Also, when extension components are propagated, in some cases an extension artifact is created, where the extension artifact can be removed once/if a last extension component is removed.

Example 5—Example Considerations for Propagating Extension Elements

As explained in conjunction with the method 300 of FIG. 3, while in some cases there can be situations where all extensions are or are not propagated to all or certain data artifacts, it can often be desirable to provide a more nuanced analysis of what extension elements should be propagated or recommended for propagation. This Example 5 provides examples of how extension elements for a data artifact that are related to elements of a query language, such as SQL or dialects thereof, can be analyzed for propagation. However, extension elements serving similar purposes, but not expressed in a query language, can be treated in a similar way. In addition, more generally, rules can be defined such that certain extension elements are marked as always propagated, never propagated, or propagated under particular conditions.

One type of extension element that can be considered for propagation is an element. An element can correspond to a literal, a variable, a field in a table (which can be thought of as a type of variable), a structured, semi-structured, or unstructured data type (where a data type can, for example, also represent a field of a database table, in that a column can be thought of as an array of a particular simple datatype, such as a string, integer, etc.). The literals, as well as variables (or elements of more complex datatypes) can be values calculated using other elements defined for the data artifact (or an extension) or otherwise specified for a data artifact (or extension). In a particular example, an "element" is a "data element," as used in the ABAP programming language.

Propagation of extension for elements can be complicated, in the it may not be clear whether it would be appropriate to propagate an extension to an element just because one data artifact references, uses, or incorporates a portion of another data artifact. For example, it may be desired to merely create a link between two data artifacts, in which case it may be sufficient simply for the referencing artifact to use a key (e.g., primary key, or key in a key value store) of the referenced object. On the other hand, if other properties (including elements—the referencing data artifact actually uses data of the referenced data artifact) of a data artifact are used by a referencing data artifact, it may be more likely that extension elements of the data artifact would also be useful in the referencing data artifact. Accordingly, in a particular implementation, extensions related to elements are not propagated to a data artifact that merely references another data artifact, such as when only the primary key of the referenced artifact is used. If other components, or a sufficient number of components, of the referenced data artifact are used, referenced, or incorporated by the referencing data artifact, elements of the referenced data artifact will be propagated to, or recommended for propagation to, the target data artifact.

In some cases, a user or process can override a presumption that particular extension elements will or not be propagated. Or different rules can be selected to be applied to different data artifacts, types of data artifacts, source or destination computing environments, etc., where the different rules can make is easier or harder to propagate extensions (or different rules can be specified, where the rules are not necessarily easier or harder than other rules).

Data artifacts can include various types of annotations, where an annotation can apply to all or a portion of a data artifact, including to particular elements. In some cases, annotations can be changed from annotating one target (e.g., element) to another. How such annotations are handled can depend on a framework available for handling annotations. In some cases, annotations are copied when an entity or element is changed for the first time, and are not automatically updated if the source data artifact has its annotation updated. The annotations are not analyzed for propagation in some cases, as it may not be clear what the purpose of the annotation is, the reasons for it being changed, or who made the change. It can be sufficient that elements (or other annotation targets) are available in a target data artifact (including via propagation using disclosed techniques), and a user or process can choose to leave an annotation in its original form (when copied/referenced) or to update the annotation as in the source data artifact.

However, in some cases, it can be useful to alert a user or process that an annotation for an element added by extension differs from an annotation from an annotation in the source data artifact (including because an annotation to an extension element in the source artifact was deleted in the source data artifact). This way, the user can be alerted to confirm the correctness of how the annotation is used in the target data artifact. In further cases, all or a portion of element annotations can be propagated. For example, a list of annotation types, annotated elements, or annotated data artifacts can be defined where propagation will be made or recommended.

As described above, data artifacts can be linked together, and these linkages can be defined by associations (for example in CSN). In addition to determining whether elements in an association should be propagated to other data artifacts, the declaration of an association can also be analyzed for propagation. This analysis can be conducted in an analogous way as described for elements. That is, if an association only references a key field of data artifact associated with an extension, then the association is not propagated to the target data artifact. If the association uses other elements of the associated data artifact, or a sufficient number (or type, or combinations of number and type) of elements, then the association is propagated to the target data artifact.

It may be useful to keep in mind that associations can serve multiple purposes. That is, associations can be used to determine "related" data artifacts, where a target data artifact can be identified based on its association with a source data artifact. However, an association can also be an extension that is considered for propagation to a target data artifact.

At least certain data artifacts select data from other data artifacts, which can be other data artifacts in a virtual data model or can be data artifacts in a physical data model, in a particular use case. In some cases, tables in a physical database model are represented as entity data artifacts in a virtual data model, and so data artifacts can select data from an entity data artifact in a virtual data model in a similar manner as how a query can retrieve data from a database using a query language, such as SQL.

Different types of operations in a query language can be treated in different ways. Certain types of operations can be considered to be of a more fundamental nature, such as affecting what data is obtained (e.g., WHERE, ON, or HAVING operations) or how data is presented (e.g., GROUP BY or ORDER BY operations). Propagating extensions can thus restrict what data is available using a target data artifact in a way that may not be desired by an organization or individual user. Similarly, reports or other software functionality may expect data to be presented in a particular order, and the reports or functionality may not be useable, or operate as expected, if extensions that alter available data or how data is presented or ordered are propagated. Thus, in at least some cases, extensions that restrict (e.g., filter) data or alter how data is provided are not propagated.

Extension elements can appear in formulas in a data artifact. Because altering elements in a formula would likely affect the output of the formula, extension elements for formular are typically treated in a similar manner as WHERE statements.

However, the above behavior can be altered in other use cases, including being a default behavior that can be overridden, where override behavior can be specified both for extensions that are normally not propagated or extensions that are normally propagated. For example, a data artifact, data artifact component, extension, or extension element can be annotated to specify a behavior that differs from a default behavior, such as indicating the certain extension elements will be propagated, will not be propagated, or specifying propagation rules that differ from default propagation rules. Or, different behavior can be specified otherwise for particular extension types, particular extensions, particular source or target data artifacts, based on specific applications, or based on specified source or target computing environments.

For these and other types of extensions, it should be appreciated that the disclosed propagation techniques typically are not expected to affect other data artifacts in a data model that explicitly include extension elements. That is, assume higher and lower-level data artifacts in a source system exist, and both include an extension. Rules may determine that an extension from the lower-level data artifact is not propagated to the higher-level data artifact. However, if the higher-level data artifact explicitly includes the extension, then the extension will typically be available in the higher-level data artifact.

Some operations, such as the AS operation, result in data (e.g., associated with an extension element, such as an element) being renamed. In addition, propagation of extension elements, as described above, can potentially result in name clashes—where a propagated extension element has the same name as an extension element in a target data artifact. Accordingly, when extension elements are propagated, it can be checked whether the name (identifier) of the extension element is unique (either unique in an overall schema, in a chain of related data artifacts, or at least with respect to a source data artifact and a target data artifact).

If the name is not unique, one of the extension elements (e.g., an element added to a target data artifact) can be renamed to avoid name collisions. It can be desirable to maintain the name of the extension element from the source data artifact close to its original name, including so that users or processes may more easily identify and understand the purpose of the extension element. Accordingly, a renaming can include adding a counter or similar extension to the name of the extension element (e.g., if an extension and a target data artifact both include an "employee" element, the element from the extension can be propagated to the target data artifact as "employee_1" or "employee_ext1", where the "ext" can indicate renaming by an extension propagation process and the "1" can be a counter that is updateable if an extension needs to be updated additional times to avoid name collisions in yet further target data artifacts). Extensions that are explicit renamings, such as AS operations, can be handled as described for name conflicts in general. That is, the extension element can be propagated to the extent it does not conflict with a name in the target data artifact (and, as with other types of extension elements, to the extent this default behavior has not been altered in some way).

Complications can arise if extension elements, such as elements, are included in particular types of operations, such as UNION operations. For example, consider an existing UNION operation that is extended to include an additional element. In general, propagation of extension elements associated with UNION operations is handled in a similar manner as aliases/name conflicts are handled. That is, the extension element is propagated, but is renamed at the target entity if a collision occurs with a name in the target data artifact.

An additional complication can arise as a UNION can involve multiple source entities. In order to achieve consistency between the data artifacts collected via a UNION, it may be appropriate to modify the source data artifacts for the UNION to also include the element added by extension. If a source data artifact does not contain the extension element (or if it is not clear whether an element in the source data artifact is the same as the extension artifact), the extension element can be added to the source data artifact, but set to a NULL value.

In some cases, more complex logic can be included to help a determination of whether two elements (an extension element and an element of a data object) are the same. For example, whether the elements share the same name, type, or description match can be used to help determine whether the elements are the same. Information can be retrieved from a data dictionary or similar source of information, including as described in Examples 7-16. Even more complex techniques can be used, such as analyzing how the elements are used in various workloads, and relevant data can be analyzed using machine learning algorithms to help determine a likelihood that two elements are the same. Various criteria (such a confidence level) can be used to determine whether two elements are sufficiently similar that renaming or addition are not needed.

INTERSECT/EXCEPT operations can be propagated in certain circumstances. These operations typically require two SELECT (or other data selection criteria) that have structurally similar output such that a comparison can be made (e.g., using standard set logic). For this reason, it may not be possible to extend only one data artifact involved in an INTERSECT operation. However, because of the issues described above in propagating extensions that modify what data is selected or how data is presented, it may be inappropriate to modify other data artifacts in the INTERSECT operation. However, extension elements associated with INTERSECT operations can be propagated in some circumstances, such as when they involve a common source. For example, the extension element can be propagated if the involved data artifacts each reference the data artifact having the relevant extension.

Example 6—Example Propagation Operations

Figure 4:
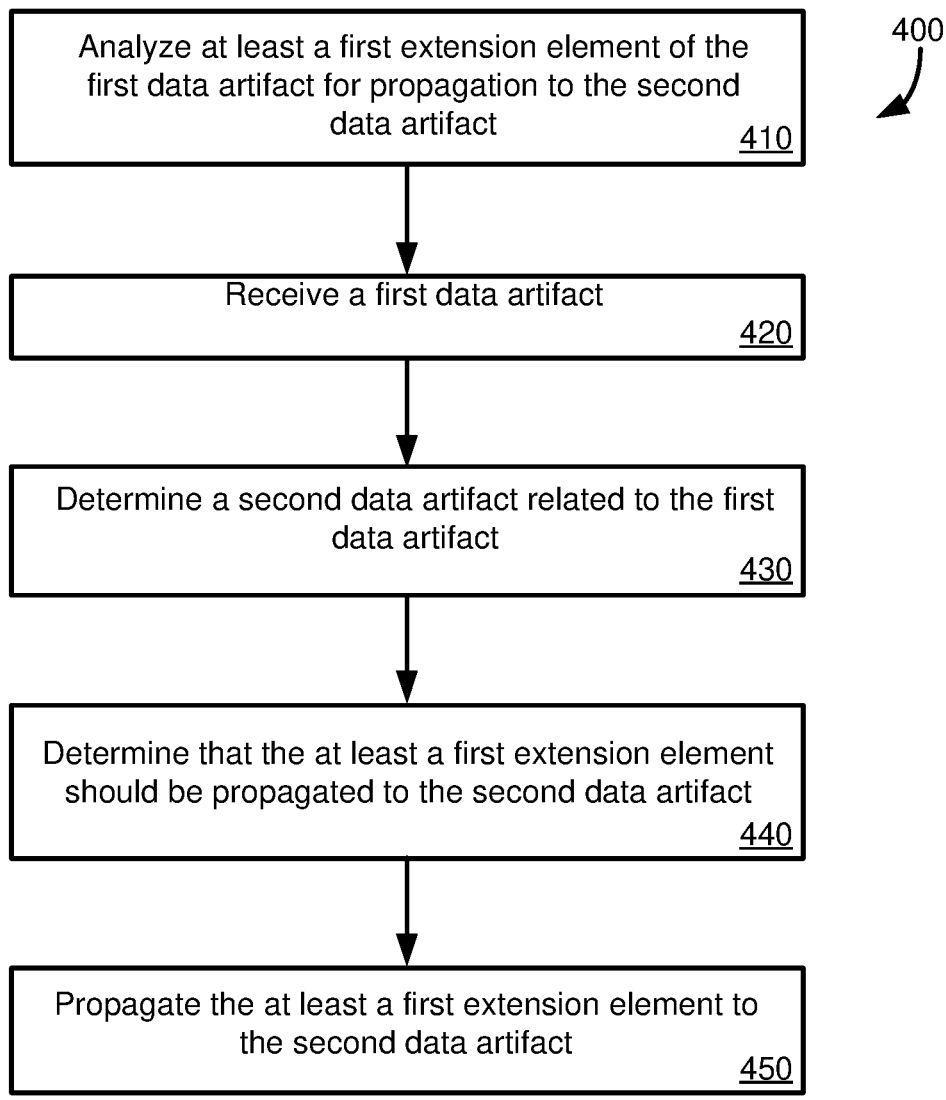
FIG. 4 is a flowchart of a method of propagating extension elements of a first data artifact to a related data artifact.

FIG. 4 illustrates a method 400 that can be used to propagate extension elements. The method 400 can be implemented in the computing environment 100 of FIG. 1 or the computing environment 200 of FIG. 2, and can represent at least certain actions described in conjunction with the method 300 of FIG. 3. More generally, the method 400 can be implemented in propagating extensions from one set of data artifacts to another set of data artifacts.

At 410, a first data artifact is received. The first data artifact includes a plurality of base elements and an extension that includes at least a first extension element. A second data artifact that is related to the first data artifact is determined at 420. At 430, the at least a first extension element is analyzed for propagation to the second data artifact. It is determined at 440 that the at least a first extension element should be propagated to the second data artifact. The at least a first extension element is propagated to the second data artifact at 450.

Example 7—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary, such as for a virtual data model. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects (or artifacts) through various properties (which can be reflected in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

Figure 5:
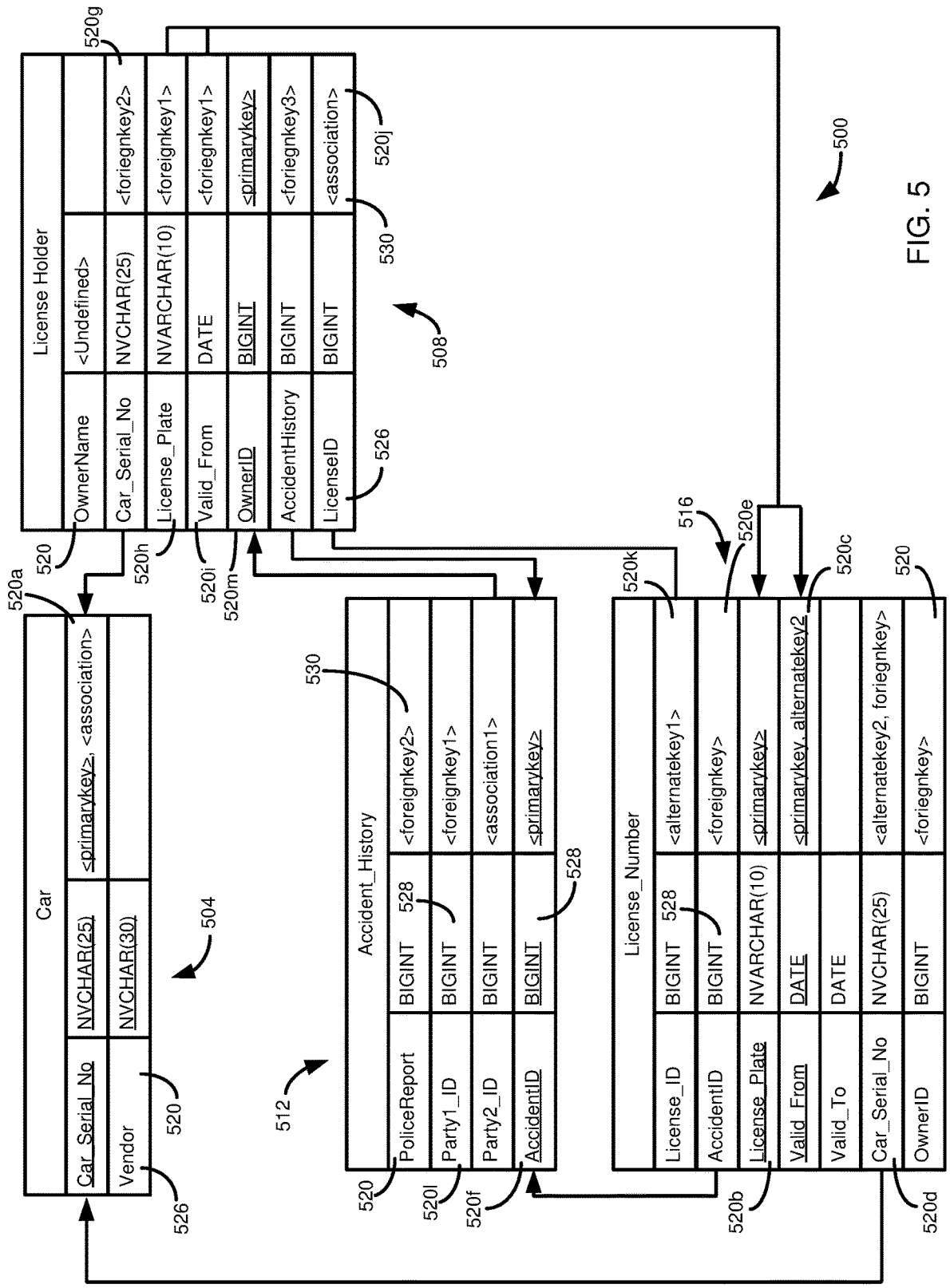
FIG. 5 is a diagram of a database schema showing technical relationships between at least a portion of database tables in the schema.

FIG. 5 is an example entity-relation (ER) type diagram illustrating a data schema 500, or artifact definition, related to a driver's accident history. The schema 500 (which can be part of a larger schema, the other components not being shown in FIG. 5) can include a table 508 associated with a license holder (e.g., an individual having a driver's license), a table 512 associated with a license, a table 516 representing an accident history, and a table 504 representing cars (or other vehicles).

Each of the tables 504, 508, 512, 516 has a plurality of attributes 520 (although, a table may only have one attribute in some circumstances). For a particular table 504, 508, 512, 516, one or more of the attributes 520 can serve as a primary key—uniquely identifying particular records in the tuple and being designated as the main method of accessing tuples in the table. For example, in the table 504, the Car_Serial_No attribute 520a serves as the primary key. In the table 516, the combination of attributes 520b and 520c together serve as the primary key.

A table can reference records associated with the primary key of another table through the use of a foreign key. For example, the license number table 516 has an attribute 520d for a Car_Serial_No in table 516 that is a foreign key and is associated with the corresponding attribute 520a of table 504. The use of a foreign key can serve various purposes. The foreign key can link particular tuples in different tables. For example, a foreign key value of 8888 for the attribute 520d would be associated with a particular tuple in table 504 having that value for attribute 520a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 516, for instance, has an alternate key that is formed from attribute 520c and attribute 520d. Thus, a unique tuple can be accessed in the table 516 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 504, 508, 512, 516, and the name 526 and datatype 528 of their associated attributes 520. Schema information may also include at least some of the information conveyable using the flag 530, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 8—Example Table Elements Including Semantic Identifiers

Figure 6:
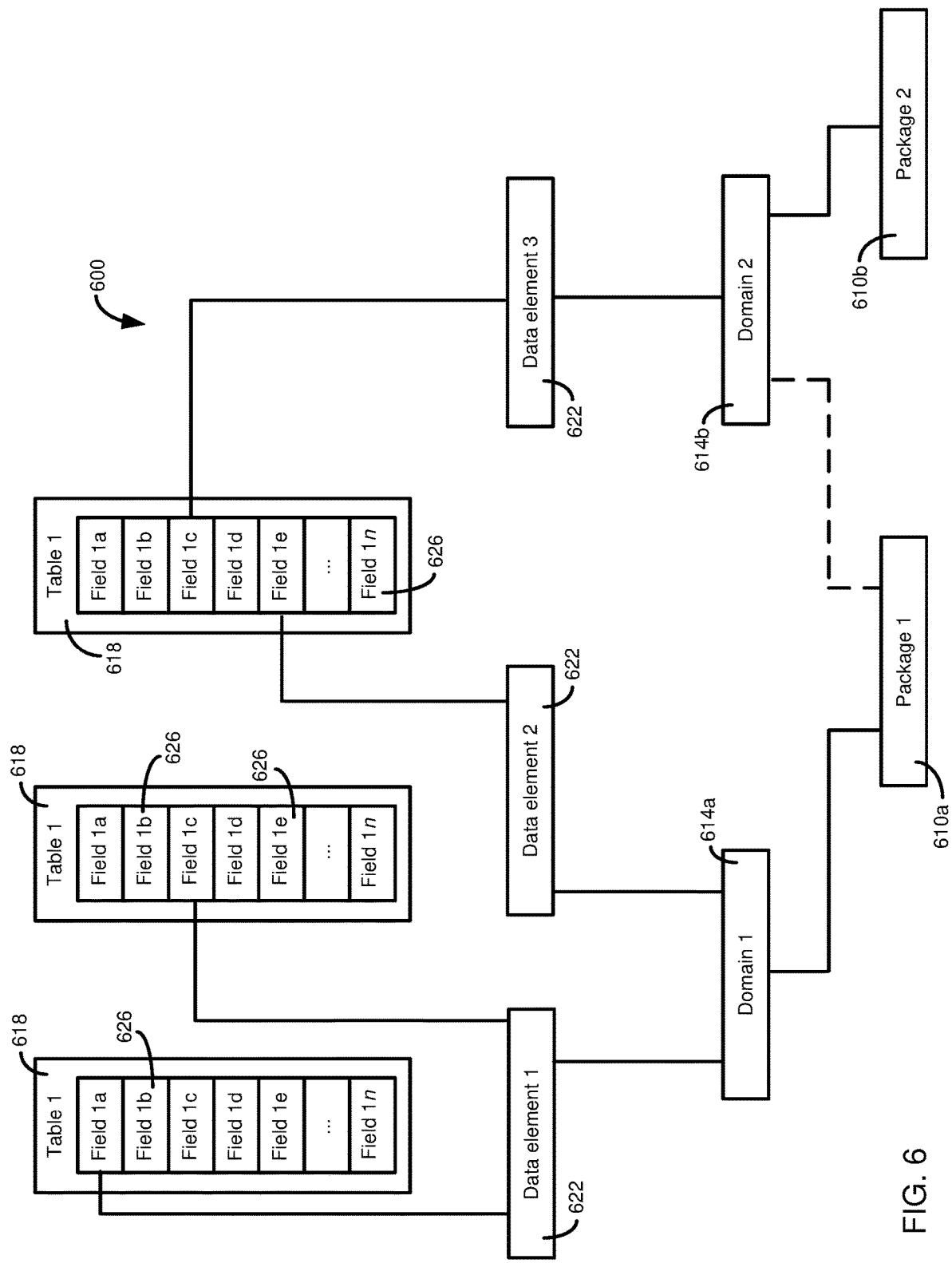
FIG. 6 is a schematic diagram illustrating relationships between table elements that can be included in a data dictionary, or otherwise used to define database tables.

FIG. 6 is a diagram illustrating elements of a database schema 600 and how they can be interrelated. In at least some cases, the database schema 600 can be maintained other than at the database layer of a database system. That is, for example, the database schema 600 (or virtual data model) can be independent of the underlying database, including a schema used for the underlying database. Typically, the database schema 600 is mapped to a schema of the database layer (e.g., schema 500 of FIG. 5), such that records, or portions thereof (e.g., particular values of particular fields) can be retrieved through the database schema 600.

The database schema 600 can include one or more packages 610. A package 610 can represent an organizational component used to categorize or classify other elements of the schema 600. For example, the package 610 can be replicated or deployed to various database systems. The package 610 can also be used to enforce security restrictions, such as by restricting access of particular users or particular applications to particular schema elements.

A package 610 can be associated with one or more domains 614 (i.e., a particular type of semantic identifier or semantic information). In turn, a domain 614 can be associated with one or more packages 610. For instance, domain 1, 614a, is associated only with package 610a, while domain 2, 614b, is associated with package 610a and package 610b. In at least some cases, a domain 614 can specify which packages 610 may use the domain. For instance, it may be that a domain 614 associated with materials used in a manufacturing process can be used by a process-control application, but not by a human resources application.

In at least some implementations, although multiple packages 610 can access a domain 614 (and database objects that incorporate the domain), a domain (and optionally other database objects, such as tables 618, data elements 622, and fields 626, described in more detail below) is primarily assigned to one package. Assigning a domain 614, and other database objects, to a unique package can help create logical (or semantic) relationships between database objects. In FIG. 6, an assignment of a domain 614 to a package 610 is shown as a solid line, while an access permission is shown as a dashed line. So, domain 614a is assigned to package 610a, and domain 614b is assigned to package 610b. Package 610a can access domain 614b, but package 610b cannot access domain 614a.

Note that at least certain database objects, such as tables 618, can include database objects that are associated with multiple packages. For example, a table 618, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 614 (that is, the domains can provide further semantic context for database objects that are associated with an object of another package, rather than being assigned to a common package).

As will be explained in more detail, a domain 614 can represent the most granular unit from which database tables 618 or other schema elements or objects can be constructed. For instance, a domain 614 may at least be associated with a datatype. Each domain 614 is associated with a unique name or identifier, and is typically associated with a description, such as a human readable textual description (or an identifier than can be correlated with a human readable textual description) providing the semantic meaning of the domain. For instance, one domain 614 can be an integer value representing a phone number, while another domain can be an integer value representing a part number, while yet another integer domain may represent a social security number. The domain 614 thus can held provide common and consistent use (e.g., semantic meaning) across the schema 600. That is, for example, whenever a domain representing a social security number is used, the corresponding fields can be recognized as having this meaning even if the fields or data elements have different identifiers or other characteristics for different tables.

The schema 600 can include one or more data elements 622. Each data element 622 is typically associated with a single domain 614. However, multiple data elements 622 can be associated with a particular domain 614. Although not shown, multiple elements of a table 618 can be associated with the same data element 622, or can be associated with different data elements having the same domain 614. Data elements 622 can serve, among other things, to allow a domain 614 to be customized for a particular table 618. Thus, the data elements 622 can provide additional semantic information for an element of a table 618.

Tables 618 include one or more fields 626, at least a portion of which are mapped to data elements 622. The fields 626 can be mapped to a schema of a database layer, or the tables 618 can be mapped to a database layer in another manner. In any case, in some embodiments, the fields 626 are mapped to a database layer in some manner Or, a database schema can include semantic information equivalent to elements of the schema 600, including the domains 614.

In some embodiments, one or more of the fields 626 are not mapped to a domain 614. For example, the fields 626 can be associated with primitive data components (e.g., primitive datatypes, such as integers, strings, Boolean values, character arrays, etc.), where the primitive data components do not include semantic information. Or, a database system can include one or more tables 618 that do not include any fields 626 that are associated with a domain 614. However, the disclosed technologies can include a schema 600 (which can be separate from, or incorporated into, a database schema) that includes a plurality of tables 618 having at least one field 626 that is associated with a domain 614, directly or through a data element 622.

Example 9—Example Data Dictionary Components

Schema information, such as information associated with the schema 600 of FIG. 6, can be stored in a repository, such as a data dictionary. In at least some cases the data dictionary is independent of, but mapped to, an underlying relational database. Such independence can allow the same database schema 600 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 7:
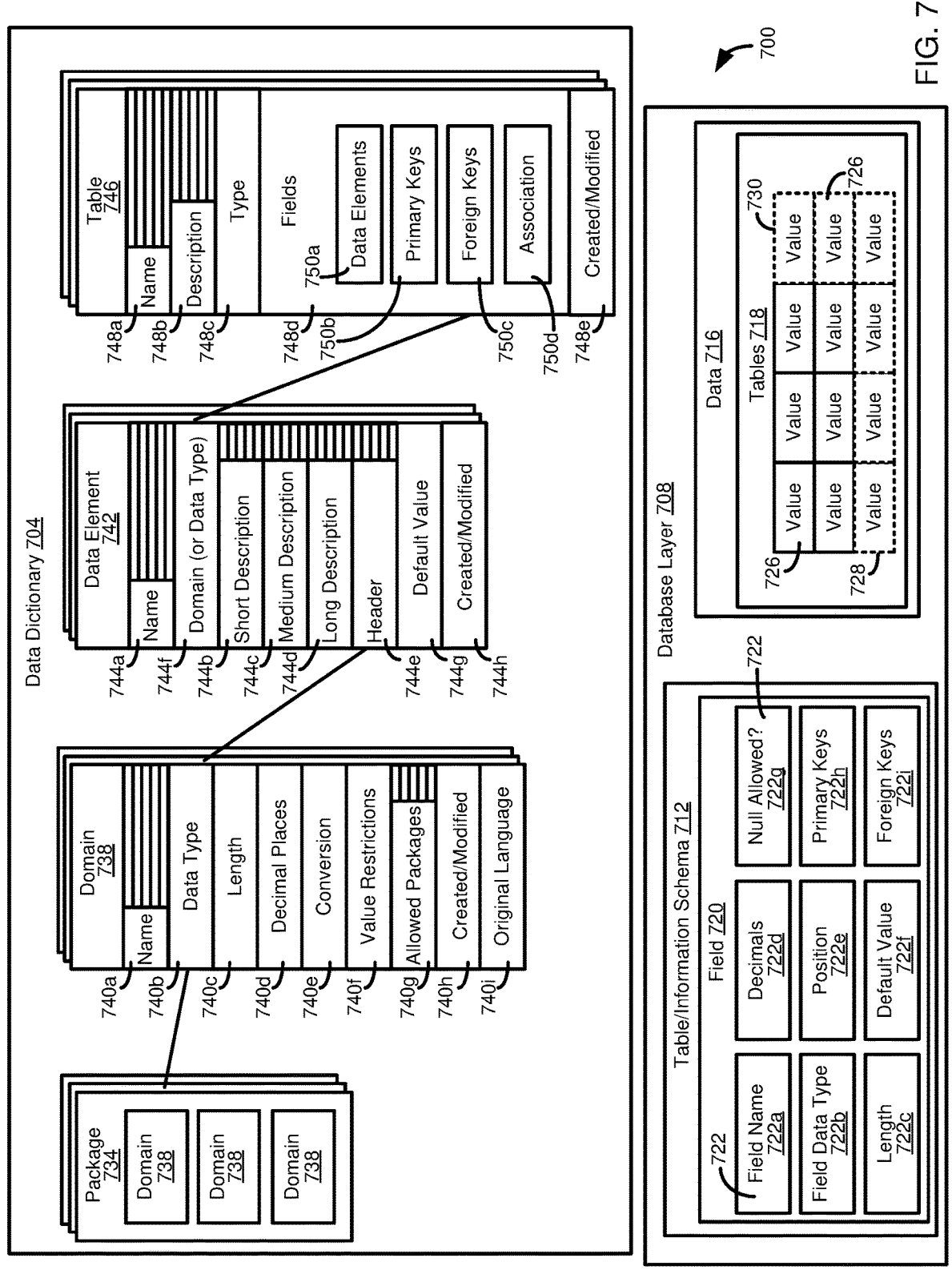
FIG. 7 a schematic diagram illustrating components of a data dictionary and components of a database layer.

FIG. 7 illustrates a database environment 700 having a data dictionary 704 that can access, such as through a mapping, a database layer 708. The database layer 708 can include a schema 712 (e.g., an INFORMATION_SCHEMA as in PostgreSQL) and data 716, such as data associated with tables 718. The schema 712 includes various technical data items/components 722, which can be associated with a field 720, such as a field name 722a (which may or may not correspond to a readily human-understandable description of the purpose of the field, or otherwise explicitly describe the semantic meaning of values for that field), a field data type 722b (e.g., integer, varchar, string, Boolean), a length 722c (e.g., the size of a number, the length of a string, etc., allowed for values in the field), a number of decimal places 722d (optionally, for suitable datatypes, such as, for a float with length 6, specifying whether the values represent XX.XXXX or XXX.XXX), a position 722e (e.g., a position in the table where the field should be displayed, such as being the first displayed field, the second displayed field, etc.), optionally, a default value 722f (e.g., "NULL," "0," or some other value), a NULL flag 722g indicating whether NULL values are allowed for the field, a primary key flag 722h indicating whether the field is, or is used in, a primary key for the table, and a foreign key element 722i, which can indicate whether the field 720 is associated with a primary key of another table, and, optionally, an identifier of the table/field referenced by the foreign key element. A particular schema 712 can include more, fewer, or different technical data items 722 than shown in FIG. 7.

The tables 718 are associated with one or more values 726. The values 726 are typically associated with a field 720 defined using one or more of the technical data elements 722. That is, each row 728 typically represents a unique tuple or record, and each column 730 is typically associated with a definition of a particular field 720. A table 718 typically is defined as a collection of the fields 720, and is given a unique identifier.

The data dictionary 704 includes one or more packages 734, one or more domains 738, one or more data elements 742, and one or more tables 746, which can at least generally correspond to the similarly titled components 610, 614, 622, 618, respectively, of FIG. 6. As explained in the discussion of FIG. 6, a package 734 includes one or more (typically a plurality) of domains 738. Each domain 738 is defined by a plurality of domain elements 740. The domain elements 740 can include one or more names 740a. The names 740a serve to identify, in some cases uniquely, a particular domain 738. A domain 738 includes at least one unique name 740a, and may include one or more names that may or may not be unique. Names which may or may not be unique can include versions of a name, or a description, of the domain 738 at various lengths or levels of detail. For instance, names 740a can include text that can be used as a label for the domain 738, and can include short, medium, and long versions, as well as text that can be specified as a heading. Or, the names 740a can include a primary name or identifier and a short description or field label that provides human understandable semantics for the domain 738.

In at least some cases, the data dictionary 704 can store at least a portion of the names 740a in multiple language, such as having domain labels available for multiple languages. In embodiments of the disclosed technologies, when domain information is used for identifying relationships between tables or other database elements or objects, including searching for particular values, information, such as names 740a, in multiple languages can be searched. For instance, if "customer" is specified, the German and French portion of the names 740a can be searched as well as an English version.

The domain elements 740 can also include information that is at least similar to information that can be included in the schema 712. For example, the domain elements 740 can include a data type 740b, a length 740c, and a number of decimal places 740d associated with relevant data types, which can correspond to the technical data elements 722b, 722c, 722d, respectively. The domain elements 740 can include conversion information 740e. The conversion information 740e can be used to convert (or interconvert) values entered for the domain 738 (including, optionally, as modified by a data element 742). For instance, conversion information 740e can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 738 can be stored in a repository, such as a field catalog.

The domain elements 740 can include one or more value restrictions 740f. A value restriction 740f can specify, for example, that negative values are or are not allowed, or particular ranges or threshold of values that are acceptable for a domain 738. In some cases, an error message or similar indication can be provided as a value is attempted to be used with a domain 738 that does not comply with a value restriction 740f. A domain element 740g can specify one or more packages 734 that are allowed to use the domain 738.

A domain element 740h can specify metadata that records creation or modification events associated with a domain element 738. For instance, the domain element 740h can record the identity of a user or application that last modified the domain element 740h, and a time that the modification occurred. In some cases, the domain element 740h stores a larger history, including a complete history, of creation and modification of a domain 738.

A domain element 740i can specify an original language associated with a domain 738, including the names 740a. The domain element 740i can be useful, for example, when it is to be determined whether the names 740a should be converted to another language, or how such conversion should be accomplished.

Data elements 742 can include data element fields 744, at least some of which can be at least generally similar to domain elements 740. For example, a data element field 744a can correspond to at least a portion of the name domain element 740a, such as being (or including) a unique identifier of a particular data element 742. The field label information described with respect to the name domain element 740a is shown as separated into a short description label 744b, a medium description label 744c, a long description label 744d, and a header description 744e. As described for the name domain element 740a, the labels and header 744b-744e can be maintained in one language or in multiple languages.

A data element field 744f can specify a domain 738 that is used with the data element 742, thus incorporating the features of the domain elements 740 into the data element. Data element field 744g can represent a default value for the data element 742, and can be at least analogous to the default value 722f of the schema 712. A created/modified data element field 744h can be at least generally similar to the domain element 740h.

Tables 746 can include one or more table elements 748. At least a portion of the table elements 748 can be at least similar to domain elements 740, such as table element 748a being at least generally similar to domain element 740a, or data element field 744a. A description table element 748b can be analogous to the description and header labels described in conjunction with the domain element 740a, or the labels and header data element fields 744b-744e. A table 746 can be associated with a type using table element 748c. Example table types include transparent tables, cluster tables, and pooled tables, such as used as in database products available from SAP SE of Walldorf, Germany.

Tables 746 can include one or more field table elements 748d. A field table element 748d can define a particular field of a particular database table. Each field table element 748d can include an identifier 750a of a particular data element 742 used for the field. Identifiers 750b-750d, can specify whether the field is, or is part of, a primary key for the table (identifier 750b), or has a relationship with one or more fields of another database table, such as being a foreign key (identifier 750c) or an association (identifier 750d).

A created/modified table element 748e can be at least generally similar to the domain element 740h.

Example 10—Example Artifact Definition

FIG. 8 illustrates a definition of an artifact definition 800. The artifact definition 800, in particular, represents a view, such as a Core Data Services view of SAP SE, of Walldorf, Germany, and be expressed in a format such as CSN. The artifact definition 800 can include a variety of different components, at least some of which can be considered to be artifact definitions. That is, the artifact definition 800 can be a model that is based at least in part on multiple sub-models. The sub-models can specify particular aspects of the overall artifact definition 800.

The artifact definition 800 can optionally include one or more annotations 804. An annotation can be a metadata component that can be added to an artifact definition. For example, a provider may supply a base model, and individual users or customers may wish to add metadata that is specific to their operating environment and use cases. The ability to add annotations can thus enhance usability by allowing for custom metadata elements, without impacting other users of a base artifact definition. Annotations can be specified for different software layers or frameworks.

In the example shown, annotations 804 can be indicated as annotations using particular syntax elements, such as by preceding an annotation with the "@" symbol. In at least some cases, annotations 804 can also be indicated by placing them in the appropriate portion of an artifact definition, such as in a header section or another section designated for annotations. In some cases, annotations 804 can reference other artifact definitions, such as an artifact definition of a data source, or can reference a data source that is associated with an artifact definition. In either event, such an association 804 can create a dependency between the artifact definition 800 and the other artifact definition/data source.

The artifact definition 800 can include instructions 808, in this case a SQL statement 810, defining a core artifact definition/object having an identifier 812 (which can be used, for example to later access or activate, such as to instantiate, the artifact definition). In particular, the instructions 808 shown define a view. The annotations 804 further specify properties of the view, as do other portions of the artifact definition 800 that will be further described.

The instructions 808 can specify one or more data sources 816. Data sources 816 can define data to which at least a portion of the metadata of the artifact definition 800 will apply, and can also supply additional metadata for the artifact definition 800. Note that the artifact definition 800 can be, in at least a sense, dependent on referenced data sources 816. For example, if the artifact definition 800 relies on particular expected data or metadata of a data source 816, the artifact definition may be unusable, have performance issues, or provide incorrect results if the referenced data sources do not include expected data or metadata, or are otherwise inconsistent with how the data source is used in the artifact definition. As shown, the data sources 816 includes two tables, "vbak" and "vbkd." These tables will typically include metadata features such as one or more fields, where each field is associated with a data type, designations of a primary key, and optionally associations with other database components, such as association or foreign key relationships with other database tables.

The artifact definition 800 can optionally include specifications of one or more associations 820. An association 820 can define a relationship to another entity. An association 820 can be processed during the use of the artifact definition 800, such as being converted to a SQL expression such as a JOIN. Unlike other conditions or elements that are included in the artifact definition 800, associations can define a relationship that can at least in some cases be optional, such as being selectively activated depending upon how the artifact definition is accessed. For example, an association 820 can be converted to a JOIN condition that uses a table provided in a SELECT statement that references the artifact definition 800.

The artifact definition 800 can include one or more components 822 that specify how data retrieved using the artifact definition should be processed, including to generate values that are associated with other metadata elements of the artifact definition. Processing can include calculating values, such as using a formula specified in, or referenced by, the artifact definition 800. In particular, a processing component 822 can specify that a particular field value should be treated as an element 824, where an element can be as described in Examples 8 and 9. Thus, the artifact definition 800 can include dependencies on how elements are defined, and the artifact definition 800 may not be accurate, or useable, if the element definition does not match how it is used, and intended to be used, in the artifact definition 800.

The artifact definition 800 can optionally include additional components, such as one or more conditions 828, or other operations, such as aggregations, unions, etc., including such operations that are typically supported by a database query language.

Example 11—Example Artifact Definition, Including Relationships with Other Artifact Definitions FIG. 9 illustrates how artifact definitions may have dependencies on other artifact definitions. In particular, FIG. 9 shows a view artifact definition 904, which can be the artifact definition 800 of FIG. 8. FIG. 9 also illustrates an artifact definition 908 for an access control object (such as a DCLS, or data control language source), an artifact definition 912 for a metadata extension object (such as a DDLX, or metadata extension), and an artifact definition 916 for an extension element object (such as a DDLS, or data definition language source).

The access control object artifact definition 908 can be used for restricting access to data that can be retrieved using the view artifact definition 904. For example, the view artifact definition 904 and the access control object artifact definition 908 can be processed together when the view artifact definition 904 is activated, such as to generate SQL commands that retrieve data for the view artifact definition, but which are filtered or restricted based on the access control object artifact definition. As the access control object artifact definition 908 references the view artifact definition 904, the access control object artifact definition depends on the view existing, and on the view containing elements specified in the access control object artifact definition. For example, the access control object artifact definition references the "SalesOrderType" element of the view "I_Sample-SalesOrder" and the authorization object "V_VBAK_AAT" with its authorization field "AUART". Thus, the first element would be undefined or unusable if the corresponding element did not exist in the view artifact definition 904.

The metadata extension object artifact definition 912 (which adds annotations to the view artifact definition 904) has similar dependencies on the view artifact definition, as does the extension element object artifact definition 916 (which adds additional elements to the view artifact definition).

Example 12—Example Relational Model of Artifact Definitions

Figure 10:
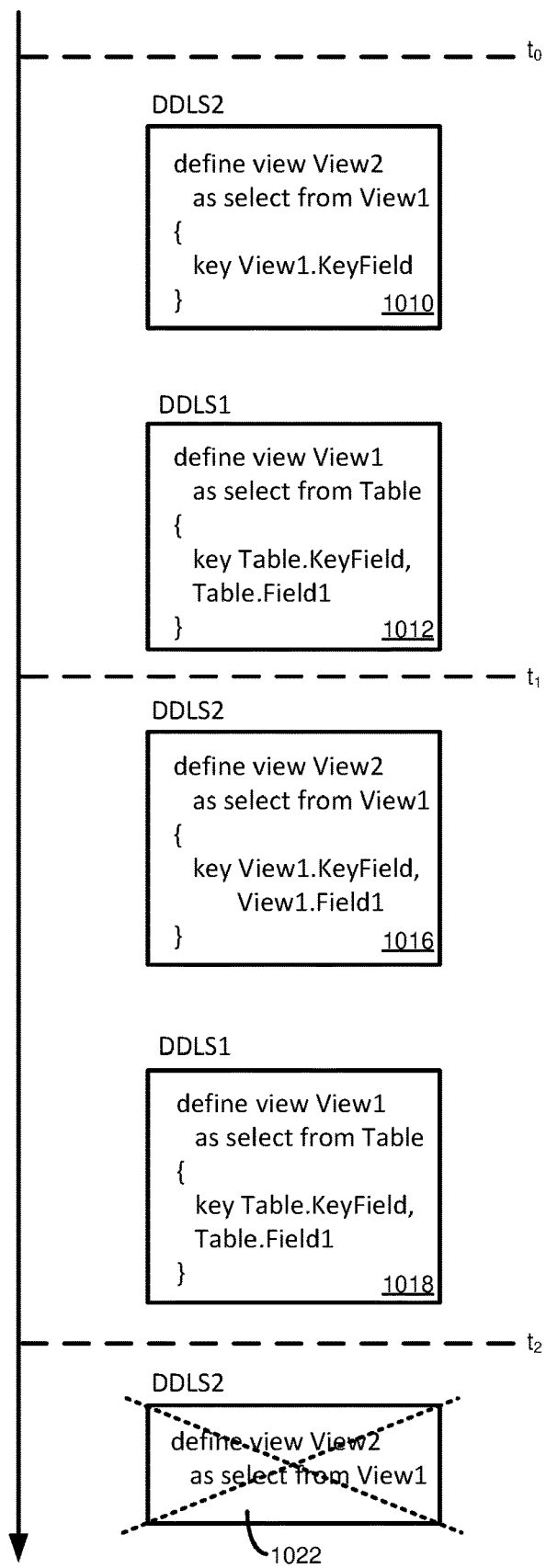
FIG. 10 is a schematic diagram illustrating how artifact definitions can be interrelated, and updated or deleted, including by multiple computing systems.

FIG. 10 illustrates how artifact definitions may be dependent on one another, and can be changed over time, which can affect the use or validity of dependent artifact definitions. At time $t_0$, data definition language versions of artifact definitions are provided. The artifact definitions are for two database objects, a model 1010 for a View1 and a model 1012 for a View2. The model 1012 for View2 references View1, as it contains a SQL select statement that defines a particular subset of data defined by the model 1010 for View1. Thus, the model 1010 includes a dependency on the model 1012. In particular, the model 1010 depends on View1 existing, and there being a field "KeyField" in View1.

At time $t_1$, a model 1016 for a second version of View2 is received. Compared with the model 1012, the model 1016 includes another field, Field1, of View1, in the definition of View2. In some cases, the model 1016 can be provided as a complete model, while in other cases only changes compared with a prior model version are sent.

At a time $t_2$, the second system uploads an indication 1022 that View2 was deleted. Note that, in this case, the deletion of View2 does not affect any described artifact definition, as View2 depended on View1, but View1 did not depend on View2. If, instead, View1 had been deleted at time $t_2$, it could be determined that deleting View1 would create issues with View2.

Figure 11A:
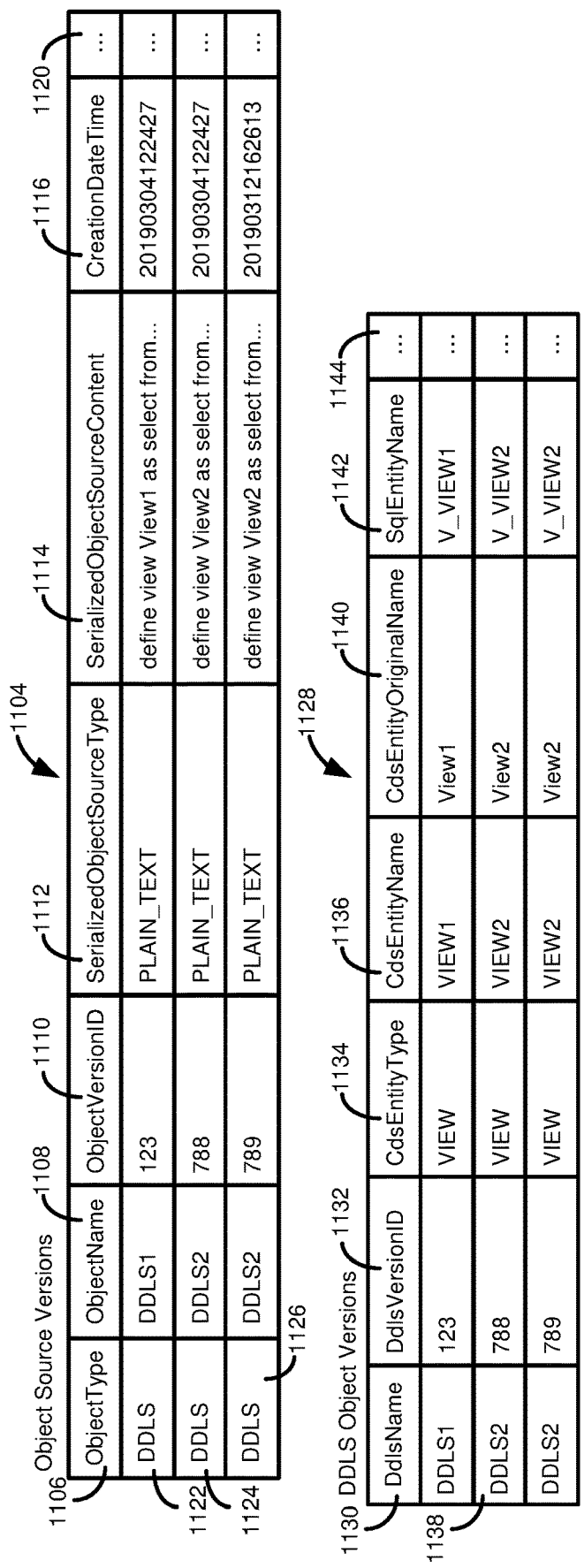
FIGS. 11A and 11B are example tables illustrating how artifact definitions can be stored in a relational format.
Figure 11B:
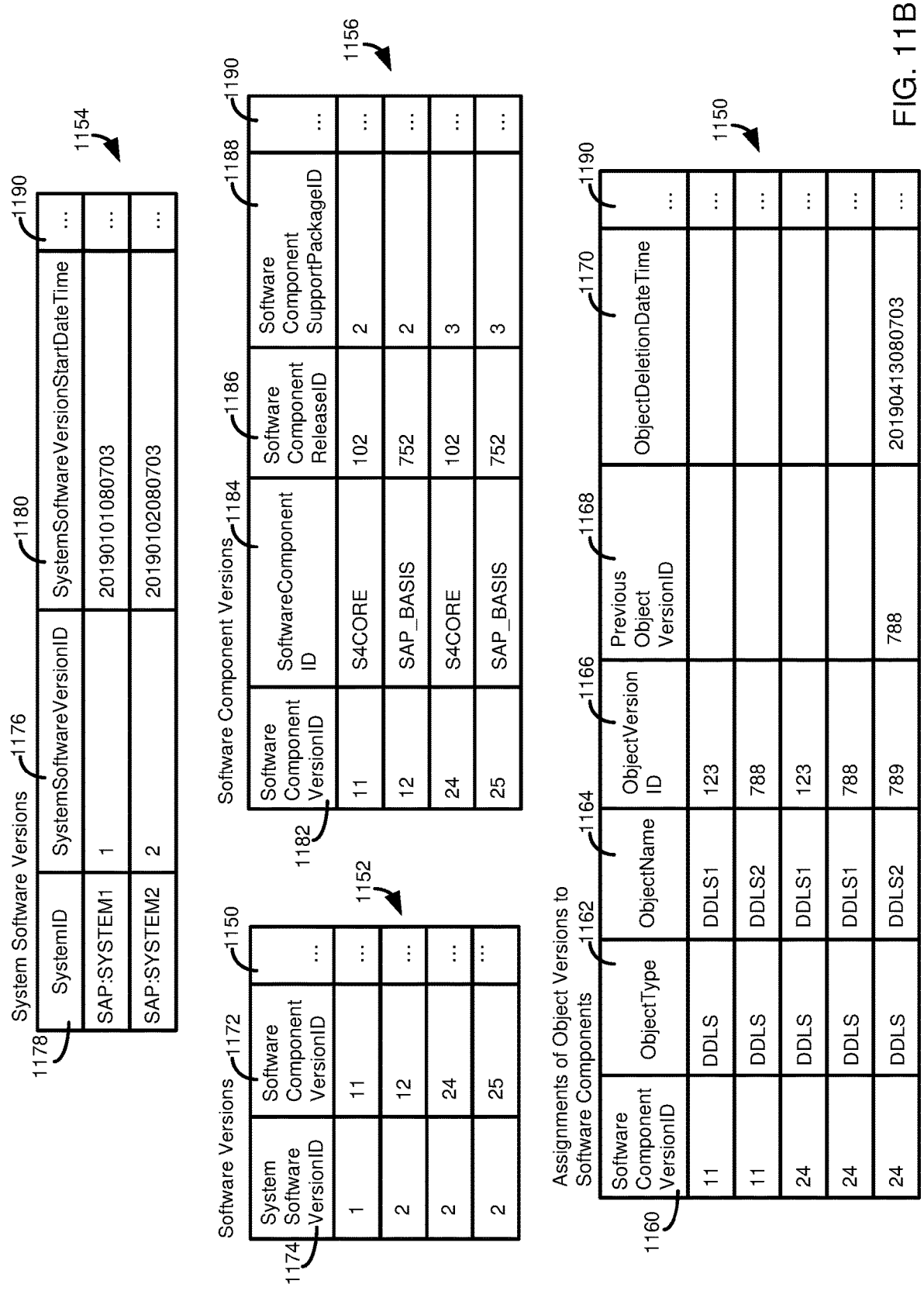

FIG. 10 illustrates the artifact definitions as defined in a first format, such as a SQL statement defining the views. FIGS. 11A and 11B illustrates how the artifact definitions shown in FIG. 10 can be converted to a different format, such records in a collection of database tables used to store representations of artifact definitions. In particular, FIG. 11A shows a table 1104 that includes a field 1106 for an object type associated with a record of the table, a field 1108 holding a name of the object, a field 1110 holding a version identifier associated with the object, a field 1112 providing a type associated with an original format in which the corresponding artifact definition was received (e.g., plain text, JSON, XML, CS ON, etc.), a field 1114 holding a listing of the original source content (in the type associated with the field 1112), and a field 1116 that includes a timestamp of when the object was received (e.g., with reference to FIG. 10, a timestamp associated with time $t_0$, $t_1$, or $t_2$). The table 1104 can optionally include one or more additional fields 1120.

It can be seen that the table 1104 includes a record 1122 for View1, received at to, a record 1124 for the artifact definition of View2 received at $t_0$, and a record 1126 for the artifact definition of View2 received at $t_1$. Note that table 1104 can include information for object source versions, and so type, name, and version information (i.e., fields 1106, 1108, 1110) can be specific for the object as an object source (e.g., a data definition language source, or DDLS).

A table 1128 can include fields for data definition language object versions, which can include a field 1130 for a DDLS name and a field 1132 for a DDLS version identifier, which fields can correspond to the fields 1108, 1110 of the table 1104. The table 1128 can further include a field 1134 that describes an entity (e.g., artifact definition) type associated with the corresponding artifact definition. Examples of entity types can be table, view, access control, annotation extension, metadata extension, etc.

A field 1136 can include an entity name or identifier, which can be a name or identifier assigned to the artifact definition in the declaration of the artifact definition, such as in the SQL statements shown in FIG. 10. For example, FIG. 10 shows artifact definition 1010 as defining a VIEW1, which then supplies the type indicated in field 1134, and the name entered in field 1136 indicated for a record 1138. Note that field 1136 can be a canonical form of the name of the artifact definition, and the original name, supplied in the artifact definition, can be included in a field 1140. Similarly, the canonical name of field 1136 can be associated with other formats, such as a format provided in a field 1142, which, as shown, can be a name used in SQL queries for the artifact definition, which can correspond to a name of the artifact definition used in a database layer, such as in an information schema. The table 1128 can include one or more additional fields 1144.

As shown in FIG. 11A, all of the information for the artifact definitions provided at $t_0$ and $t_1$ in FIG. 10 can be retrieved from the tables 1104, 1128, either from individual fields or from the field 1114 with the original source content. FIG. 11B illustrates tables 1150, 1152, 1154, 1156, which can store additional information about the artifact definitions, including about the systems from which the artifact definitions, or updates (including deletions) were received. In particular, table 1150 can be used to associate artifact definitions with software component version identifiers, which can be used to describe the operating environment on the system from which the artifact definition was received. Table 1150 includes a field 1160 for the software component version ID associated with the artifact definition object name listed in field 1164 (and which corresponds to the field 1108 of table 1104) and the version identifier of field 1166 (which corresponds to the field 1110 of table 1104). A type for the object can be specified in a field 1162.

When an artifact definition is changed, the version associated with the identifier in the field 1166 can be linked to a prior version of the artifact definition, which can be stored in a field 1168. In the case of an artifact definition deletion, a deletion time can be listed in a field 1170 (where no value, or a NULL value, can indicate that the object has not been deleted). In some cases, the deletion field 1170 can be filled out for all versions of the data model. In other cases, the deletion field 1170 is only populated for the last version of the artifact definition prior to the deletion.

The table 1152 can associate particular software components, listed in field 1172 (and corresponding to field 1160) with specific system software versions listed in a field 1174. In turn, table 1154 can associate the specific software system versions, in a field 1176, with specific systems indicated by a system identifier in a field 1178, and a timestamp in field 1180 indicating when the system was installed, released, or activated. The table 1156 can include a field 1182 for particular software component versions, corresponding to field 1160 with an identifier of the software component provided in field 1184, a release identifier in field 1186, and a support package identifier in a field 1188. Each of the tables 1150, 1152, 1154, 1156 can optionally include one or more additional fields 1190.

Figure 12:
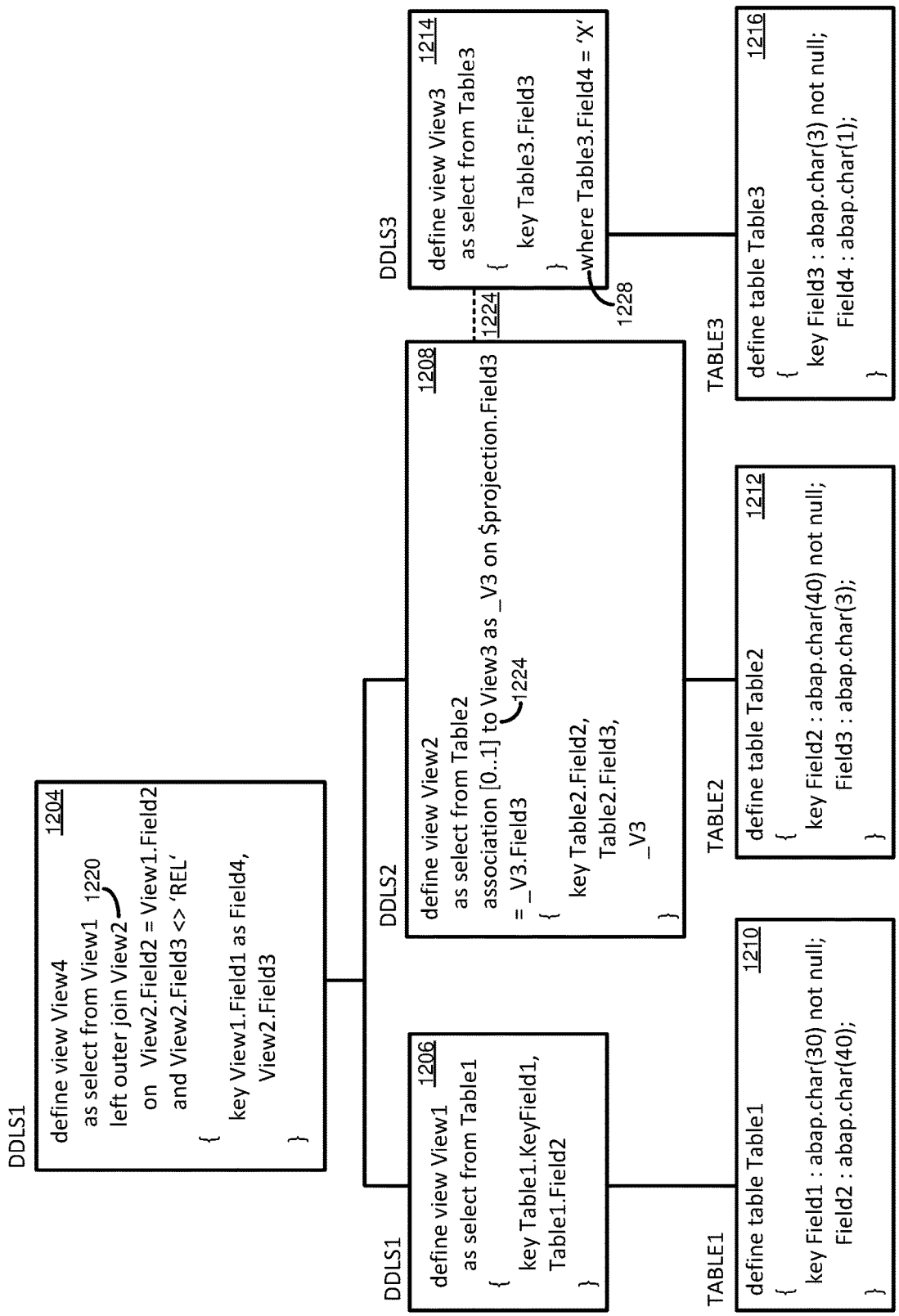
FIG. 12 is a schematic diagram illustrating how artifact definitions can be interrelated, and can include query operations, such as select statements, join conditions, and where conditions, and how database objects can be related by associations.

Example 13—Example Metadata Relational Model, Including Query Language Operations FIG. 12 illustrates a scenario where an artifact definition 1204, in particular, a view, is defined with reference to two view artifact definitions 1206, 1208, which can in turn depend on one or more additional data models. The artifact definition 1206 depends from an artifact definition 1210 for a table, while the artifact definition 1208 depends from an artifact definition 1212 for a table, and has an association with an artifact definition 1214 for another view, which in turn references an artifact definition 1216 for a table. These dependencies can be evaluated as described for a scoping function and a traversal component for identifying database artifacts and associated metadata for one or more specified artifacts (including artifacts that are responsive to a particular search/query request).

The view artifact definitions 1204, 1206, 1208, 1214 include SQL select statements that can be stored in an alternative format, such as in tabular form, as shown in FIG. 13. The select statements of the view artifact definitions 1204, 1206, 1208, 1214 of FIG. 12 can include additional features/operations that can be stored in an alternative representation, such as a join condition 1220 in the artifact definition 1204, an association 1224 between the artifact definition 1208 and the artifact definition 1214, and a where condition 1228 in the artifact definition 1214.

FIG. 13 illustrates a table 1304 that can store information for artifact definitions having select statements in tabular format. Table 1304 includes a field 1308 for an object type, which for the artifact definitions 1204, 1206, 1208, 1214 is a data definition language source object. A field 1310 includes a name or identifier for each record, which can be a system assigned name, or a name used for system purposes, for a given object, such as to uniquely identify each object.

Note that the SQL statements in FIG. 12 do not assign the name used in the field 1310. A field 1312 can store an object version identifier value for the object associated with each record. In some cases, the value stored in the field 1312 can be unique to the given object, and can be incremented when a change is made to the object. For example, record 1316 is shown as having an object version identifier of 56 for the DDLS1 object. If the DDLS1 object is changed again, the object version identifier can be incremented to 57.

The table 1304 can include a field 1320 that stores an entity name, which can be an entity name used in the SQL statements shown in FIG. 12. For example, the artifact definition 1204 defines a view View4, which is the name provided in the field 1320 for record 1322, corresponding to View4. In at least some cases, each object in the table 1304 can be associated with a primary data source. For example, a SQL statement can have the form "SELECT FROM primaryDataSource," where the identifier of "primaryDataSource" is stored in the field 1324. For artifact definition 1204, View4 is defined primarily with respect to View1, and so View1 is listed in field 1324 for record 1322. The primary data source of field 1324 can have a type, such as table or field, which type is provided in a field 1326.

As described, a select statement used in an artifact definition can have additional operations, which can be recorded in the table 1304. If an object artifact definition includes a where condition, an identifier for that condition can be included in a field 1328. Artifact definition 1214 includes where condition 1228, and so an identifier for that condition can be entered in the field 1328 for record 1322. The identifier in the field 1328 can identify a particular condition collection, where additional information can be included in a condition collection table 1332, as will be further described. Similarly, if an object artifact definition includes a join condition, an identifier for the condition can be included in a field 1336. The identifier in the field 1334 can identify a condition collection in the table 1332.

The table 1332 allows condition details associated with the select statements in table 1304 to be further detailed. The table 1332 includes an object type field 1338 and an object name field 1340, which can correspond to the fields 1308, 1310 of table 1304. Note that the join condition of artifact definition 1204 is represented by records 1344-1348, the "where" condition of artifact definition 1214 is represented by record 1350, and the "on" condition of the association of artifact definition 1208 is represented by record 1352.

The table 1332 includes a field 1356 for a version identifier of the object listed in the field 1340, and can correspond to the field 1312. A field 1358 includes condition collection identifiers, and can correspond to the fields 1328, 1336. A group ID field 1360 and a grouping ordinal number field 1362 can be used to preserve the semantics of the conditions as originally expressed (e.g., in SQL). For example, the group ID field 1360 can be used to indicate portions of a condition that are associated with a data source indicated in a field 1364. So, record 1344 is associated with a group identifier in field 1360 of 1, as it is associated with a value of VIEW1 in field 1364, while records 1346, 1348 are associated with a group identifier of 2, as both records are both associated with a value of VIEW2 for field 1364. The values of the grouping ordinal number field 1362 can further identify particular semantics for the records 1346, 1348, such as indicating that record 1346 precedes record 1348 in the original select statement. A grouping operator field 1366 can provide an operator that associates records associated with a particular group identifier value of the field 1360.

For a given operator or relation listed in a field 1368, fields 1370, 1364, 1372, 1374 can list a left group identifier, the left data source name, a left field name, and a left value, respectively. Similarly, fields 1376, 1378, 1380, 1382 can provide a right group identifier, a right group source name, a right field name, and a right value, respectively. "Left" and "right" refer to the position of the values with respect to the operator of the field 1368.

It can thus be seen that the records of the table 1332 can be used to reconstitute the operations or conditions of the artifact definitions in the format shown in FIG. 12. Although the table 1332 may not explicitly list a type of operation or condition, that information can be gathered from the fields 1328, 1336 of the table 1304 (or from the table 1384, as will be further described).

An association definition table 1384 can define associations included in artifact definitions, such as models provided in the format shown in FIG. 12, and can include an object type field 1386, an object name field 1387, an object version identifier field 1388, and an entity name field 1389, which can be as described for the fields 1308, 1310, 1312, 1320 of table 1304. A field 1390 can store a standardized version of an object identifier (e.g., an identifier of an object artifact definition) listed in a field 1392, which can be the object name as included in the association definition in the original artifact definition, such as the association 1224. A field 1394 can provide a name of the associated entity, and a type associated with the entity (e.g., table, view) can be provided in a field 1395. An association can be associated with a minimum cardinality and a maximum cardinality, fields 1396 and 1397, respectively. A field 1398 can include a condition collection identifier, which can correspond to the field 1358 of the table 1332.

Taking the example association 1224 of FIG. 12, the record 1352 sets forth the condition defined for the association (i.e., the "on" condition). For example, values in a FIELD3 of the table referenced by the view 1208 being defined being equal to a FIELD3 of the associated view defined in artifact definition 1214, which in turn are associated with the table defined in artifact definition 1216.

The tables 1304, 1332, 1384 can optionally include one or more additional fields 1399.

Example 14—Example Relational Artifact Definition, Including Field Definitions and Relations In some cases, a metadata object, such as a view, can include fields that are calculated or otherwise based at least in part on elements (e.g., fields) of one or more other artifact definitions. The calculations can be explicitly specified in the artifact definition, or can be referenced in the model definition, such as by calling in a built-in function or referencing a function in another artifact definition, in a library, an API call, etc.

FIG. 14 illustrates an artifact definition 1404 that defines a view with reference to an artifact definition 1408, that in turn references a table defined by an artifact definition 1412. The artifact definition 1404 includes four fields, 1420, 1422, 1424, 1426 that are derived from fields in the artifact definition 1408. The artifact definition 1408 includes three fields 1430, 1432, 1434 that are selected from the table defined by the artifact definition 1412. The table defined by the artifact definition 1412 includes three fields 1440, 1442, 1444 that are declared/defined in that artifact definition.

FIG. 15 illustrates a table 1500 that can be used to summarize the fields used in the artifact definitions 1404, 1408, 1412. The table 1500 includes a field 1502 that indicates the type of object with which the field is associated, such as being associated with a table or a data definition language source object (e.g., a view). A name of the object is provided in a field 1504, which can be an object name used by, or supplied by, a system with which the artifact definition is used, or, for example, by a metadata repository A version identifier for the object can be provided in a field 1506, which, as discussed for other artifact definition representations, can be a unique number for each object, and can be incremented as the object is changed. An entity name field 1508 can include a name that is associated with the artifact definition, such as a name that is defined in the declaration of the artifact definition.

Each metadata object can be associated with one or more fields, and a field 1510 can store a standardized representation of a field name provided in a field 1512. For example, the field 1510 can store a name that removes formatting/capitalization (e.g., lower case letters) from the field name listed in the field 1512. As described, artifact definitions may incorporate fields from other artifact definitions. The immediate source of the field can have a name, provided in a field 1514, and can have a type, such as a table or view, and this type can be provided in a field 1516. The name of the field in the immediate source can be different than the name of the field in the artifact definition into which it is incorporated, so a field 1518 can include the name of the field in the source artifact definition.

Calculated fields can be associated with an expression, and an identifier for the expression can be provided in a field 1520, which can be used to access the expression, such as an expression stored as a representation in one or more other tables. A field 1522 can indicate whether the field is a key field (e.g., a field used in a primary key). Fields can be associated with a data type, which can be listed in a field 1526, and a data type can be associated with additional semantic or technical information, such as in a data element, an identifier for which can be provided in a field 1524. Often, a data type associated with a field 1526 (and in turn with the field 1524) can have a length, such as number of digits or characters that are allowed, and this information can be included in a field 1528.

Numerical fields that allow for the use of decimals can be associated with a value (e.g., a number of decimal places allowed) through a field 1530. Fields 1532, 1534, 1536, 1538 can be used to define where in a source artifact definition a definition of the expression appears, such as a start line, start column, end line, and end column, respectively. The table 1500 can optionally include one or more additional fields 1540.

As an example of how the table 1504 can be used to represent fields from the artifact definitions of FIG. 14, consider record 1550, associated with the artifact definition 1408. Artifact definition 1408 is for a view, VIEW1, and references a Field1 of Tablet (defined by the artifact definition 1412), which is a key field. Record 1552 corresponds to the definition of Field1 of Tablet in the artifact definition 1412, where Field1 is defined as a key field, that has data element type DE1, and may not be a null value. Record 1550 includes the name of the object, VIEW1, in field 1508, the name, FIELD1, of the field in the object in field 1510, the original name, Field1, of the field in the object in field 1514, the name of the entity where the field is referenced from, TABLE1, in field 1516, the type of the referenced entity, TABL (for table) in field 1516, and the name of the field, FIELD1, in the referenced entity in field 1518. Field 1522 of record 1550 is set to TRUE, indicating that the field associated with record 1550 is a key field, while field 1524 specifies that the field has a data element type of DE1, which fields 1526 and 1528 indicate is a character data type of length 30.

Example 15—Example Relational Artifact Definition, Including Annotations

Figure 16:
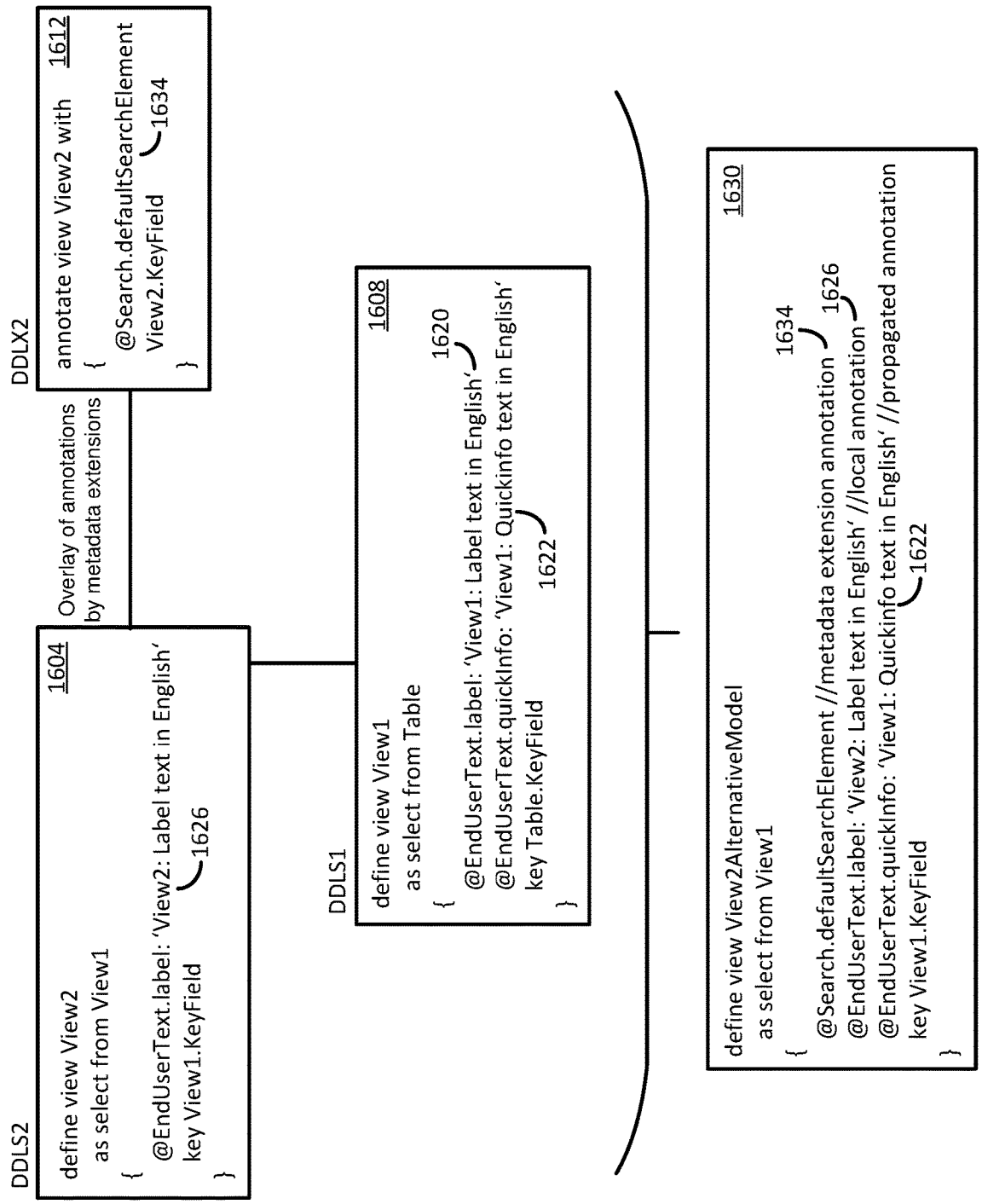
FIG. 16 is a schematic diagram illustrating how artifact definitions can be related, including artifact definitions having annotations and artifact definitions that annotate other artifact definitions.

As described in Example 10, a metadata object, such as a view definition, can include annotations. FIG. 16 illustrates how metadata objects, which can have dependencies on one another, can have annotations, which can be stored in another format, such as the format shown in the table 1700 of FIG. 17.

FIG. 16 includes an artifact definition 1604 for a view, View2, which is defined with respect to another view, View1, defined in artifact definition 1608. An artifact definition 1612 for a metadata extension, DDLX2, provides additional metadata elements for the artifact definition 1604. The artifact definition 1608 includes two annotations, 1620, 1622 that may be incorporated into the artifact definition 1604. However, the annotation 1620, which provides a label for View1, is superseded by an annotation 1626 defined in the artifact definition 1604 for View2. An annotation can be superseded, in some cases, if the annotation has the same name or type (e.g., "@EndUserText.label" as shown) in the referencing artifact definition as in the referenced artifact definition.

Artifact definition 1630 illustrates an "effective" representation of the artifact definition 1604, including annotations incorporated into the artifact definition 1604 by dependency. It can be seen that the effective artifact definition 1630 includes the annotation 1626, but not the annotation 1620. As the annotation 1622 for the artifact definition 1608 is not superseded, it is included in the effective artifact definition 1630, as is an annotation 1634 from the artifact definition 1612.

The table 1700 can summarize the annotations of the artifact definitions of FIG. 16. The table 1700 includes a field 1704 for an object type associated with the artifact definition which is annotated by a record representing an annotation. As shown, the field 1704 includes values of "DDLS" for views, or "DDLX" for metadata extension objects. A field 1708 can provide a name of the object, such as a system name, while a field 1712 can provide an object name defined by the declaration of the object. A field 1710 can provide a version identifier for the object. A field 1714 can provide a name of a subentity associated with an annotation, which can be, for example, a particular view field to which an annotation applies.

A field 1716 can provide an annotation internal identifier, which can be used to distinguish between multiple annotations for an artifact definition, and can be used to provide an ordering of annotations when multiple annotations are present in an artifact definition. A value of the field 1716 can also be used to correlate a base or parent annotation or annotation type with a sub-annotation, as will be further described. An annotation name can be included in a field 1718, which can be a type (or class) or subtype (or class method or class data member) of an annotation. A field 1720 can provide an identifier for a parent annotation. For example, record 1740 assigned an annotation internal identifier of "1" to the "ENDUSERTEXT" annotation. "ENDUSERTEXT" can be a base annotation type, and record 1742 can include the subtype of the annotation, "ENDUSERTEXT.LABEL," where the value of "1" in field 1720 indicates that the record 1742 refers to the annotation of record 1740.

A value of the annotation as defined in the declaration of the artifact definition can be provided in a field 1722. The value in the field 1722 represents the explicitly defined value assigned to the annotation. An effective value assigned to the annotation can be indicated in a field 1724. For example, the annotation @Search.defaultSearchElement has the effective value "TRUE" even though this is not explicitly captured in the declaration of the artifact definition but automatically derived from the annotation defaulting logic. Furthermore, in the example shown, the effective value for language dependent texts can be specified with respect to an identifier in a table 1750, where the value in the field 1724 corresponds to a value in a text identifier field 1754. The table 1750 is also shown as including a field 1756 that provides a code for a language associated with the text, and the actual text to be displayed can be provided in a field 1758.

Figure 18:
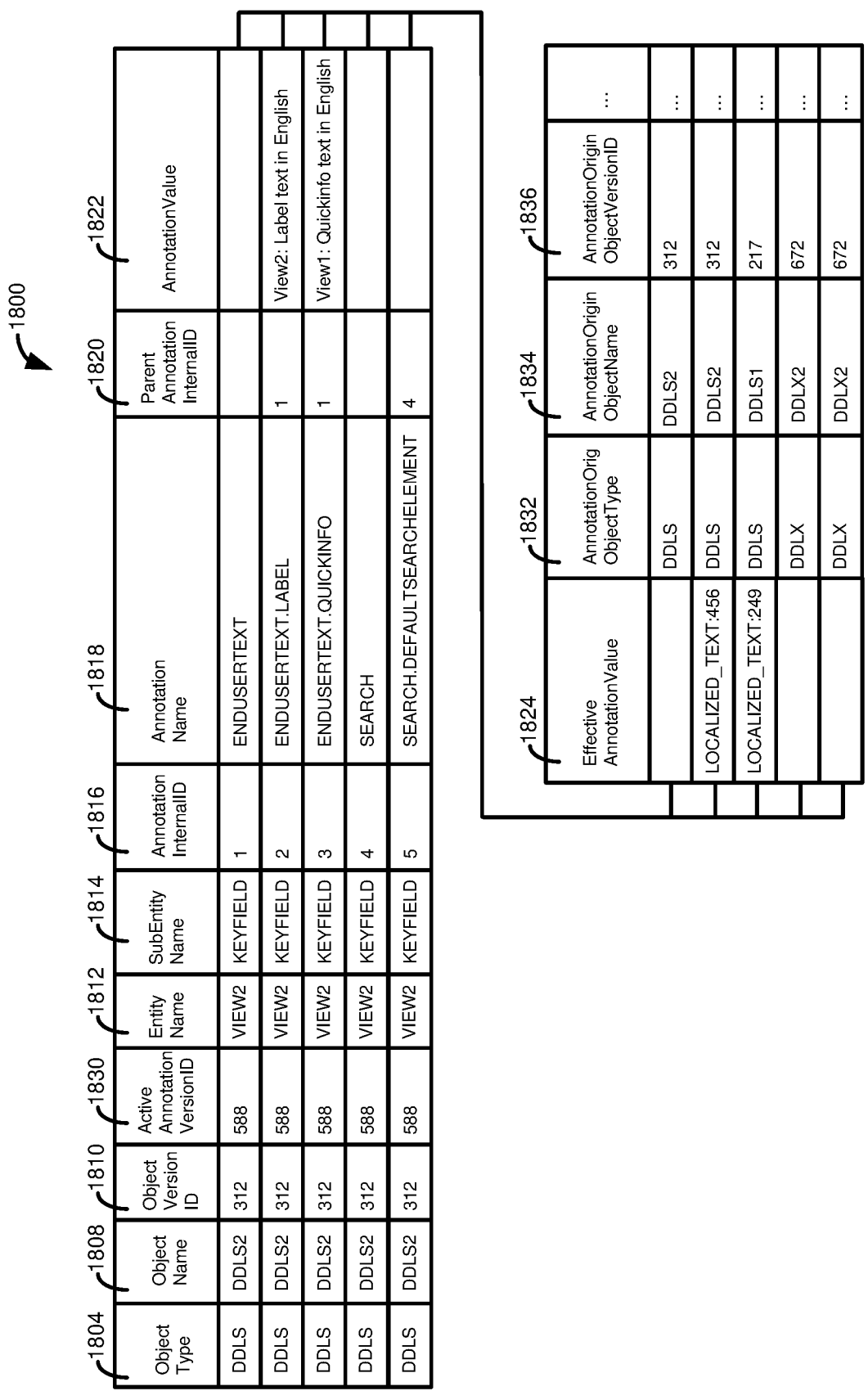

The table 1700 can store information for all annotations that are incorporated into a particular artifact definition. However, as described, some of the annotations may not be "active," in that, for instance, a locally declared annotation may overwrite an imported or referenced annotation. Similarly, in some cases annotations from multiple referenced sources (e.g., artifact definitions) may overlap or conflict, in which case only one (or, generally, a subset) of the annotations may be designated as active. It can be beneficial to separately maintain a repository of active annotations, which can be stored as shown in the table 1800 of FIG. 18.

The table 1800 can include a field 1804 for an object type, a field 1808 for an object name, a field 1810 for an object version identifier, a field 1812 for an entity name, a field 1814 for a subentity name, a field 1816 for an annotation internal identifier, a field 1818 for an annotation name, a field 1820 for a parent annotation identifier, a field 1822 for an annotation value, and a field 1824 for an effective annotation value, which fields can be implemented at least generally described for the similarly titled and numbered fields of the table 1700.

The table 1800 can include additional fields, such as an active annotation version identifier field 1830. Note that the active annotation version identifier in the field 1830 can have a value that is different than the object version identifier in the field 1810. For example, a new metadata extension could change the active annotation of an existing base (e.g., view) model version being annotated, so it may be useful to track the versions separately.

As annotations can be imported from other sources, it can be useful to track information about such annotations with respect to their source object (e.g., artifact definition). Accordingly, a field 1832 can store the object type associated with the annotation (either the local object type or the object type of the object from which the annotation is being imported), while a field 1834 can store the name of the originating object. A field 1836 can store the version identifier of the originating object.

Example 16—Example API for Metadata Access

Users or applications can access stored artifact definitions, such as metadata maintained in one or more of the tabular formats described in Examples 12-15. In some cases, the information can be accessed via an API, such as a web-based API using REST services. In a particular example, the API can use the OData protocol.

Figure 19:
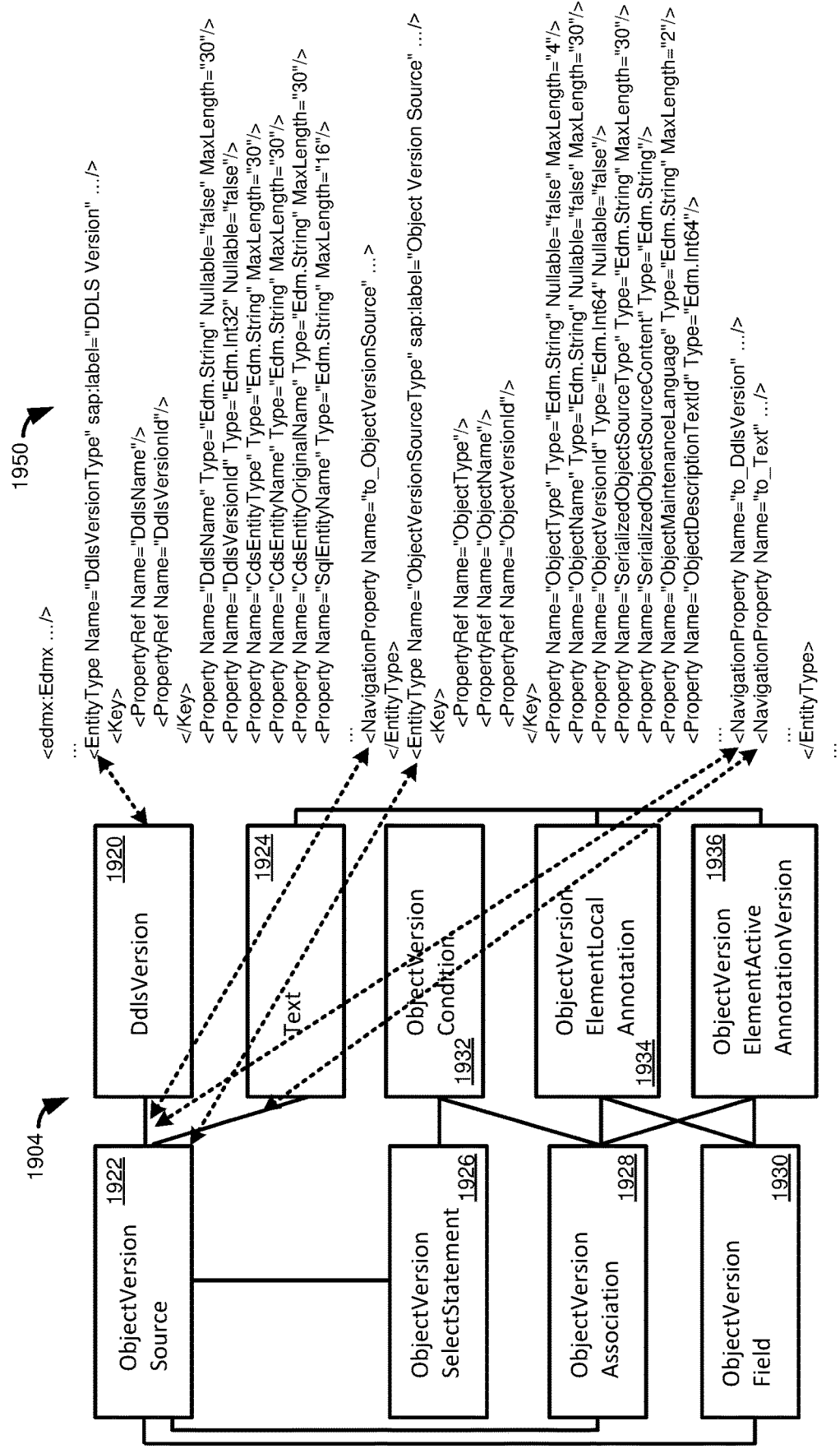
FIG. 19 illustrates code for a data access service that can access a persistency model for artifact definitions.

FIG. 19 illustrates an extract 1904 of a persistency model (e.g., all or a portion of the tables of Examples 12-15) and an extract 1950 of an OData service that can be used to access data maintained in the persistency, or determined or calculated from data in the persistency. The persistency extract 1904 can include tables, or portions thereof (e.g., one or more fields), for DDLS version information 1920, object version source information 1922, textual information 1924 (e.g., text of original metadata object definition information), select statement information 1926 associated with object versions, association information 1928 associated with object versions, field information 1930 associated with object versions, condition information 1932 associated with object versions (e.g., "where" or "on" conditions, such as described with respect to table 1332), local annotation information 1934 associated with object versions, and active annotation information 1936 associated with object versions.

An API, or other functionality for accessing services of a metadata service, can provide functionality for, among other things, querying and maintaining representations of artifact definitions, such as to create, update, or delete artifact definition representations (or specific versions thereof). The API can allow for other options, such as aggregating data from persisted artifact definition representations or searching a metadata repository, including using fuzzy search techniques. For example, a user (or an application) might request information regarding how many objects are registered in a repository, how many versions are associated with a particular object, or a number of fields, such as a maximum number of fields, that an object may have.

FIG. 20 illustrates an example table 2004 having objection version source information, and an example table 2008 having DDLS version information. The table 2004 can have multiple fields, including a field 2012 for an object type associated with a record, a field 2014 for an object name associated with a record, and a field 2016 for an object version identifier associated with a record. The table 2008 can have a field 2020 for a DDLS name, a DDLS version field 2022, an entity name (such as a CDS entity name) field 2024, and an original entity name field (such as an original CDS entity name) field 2026.

Taking the metadata representations of tables 2004 and 2008 and using the extract 1950, a navigation property of the extract can be traversed to the DDLS version table 2008 from a record of the object version source table 2004 by an OData read request like: . . . /sap/opu/odata/sap/CdsMetadataService/ObjectVersionSource(ObjectType='DDLS', ObjectName='I_SALESORDER',ObjectVersionId=1)/to_DdlsVersion The operation results in the related data record:

```
<?xml version="1.0" encoding="UTF-8"?> ...
<id>.../sap/opu/odata/sap/CdsMetadataService/DdlsVersion(DdlsName='I_SALESORDER',
DdlsVersionId=1)</id> ...
<content type="application/xml">
   <m:properties>
      <d:DdlsName>I_SALESORDER</d:DdlsName>
      <d:DdlsVersionId>1</d:DdlsVersionId>
      ...
   </m:properties>
</content> ...
```

The API can allow all related information for a given object version to be searched. For example, a search request for "cust" can have the form: . . . /sap/opu/odata/sap/CdsMetadataService/Ddls/?search=cust Which retrieves all five records having the DDLS object name (e.g., field 2014) as I_CUSTOMER. Note that a user can retrieve and access metadata information without knowing the exact name of an artifact definition or any of its constituent elements.

An API, or other metadata service access functionality, can support other services, including services based on more coarse granular actions than just simply retrieving and updating artifact definitions. These services can include uploading object source information, comparing artifact definitions (and parts thereof), including comparing artifact definitions between different components or system versions. Analysis can be provided of where various artifact definitions, or elements, are used, including identifying dependencies between artifact definitions/artifact definition components. Providing such services can be more efficient, and less error prone, than achieving the functionality every time through the application of multiple lower-level functions.

As an example, for a request to upload an artifact definition, instead of converting object source information for each individual table starting with the object version table to tables storing more detailed information, a user or application can request an upload object action, which can supply an original string defining the object (e.g., the original SQL statement), optionally along with additional information, such as the type of the original source string (e.g., SQL, XML, plain text), the name of the object, the object type (e.g., view, table), other information, and combinations thereof. The input can include:

ObjectType
  ObjectName
  SerializedObjectSourceType
  SerializedObjectSourceContent
  ObjectMaintenanceLanguage
  ObjectLastChangedDateTime
  SoftwareComponentId
  SoftwareComponentReleaseId A metadata repository can be queried to determine whether a new version of the artifact definition needs to be created, and, if so, can convert the uploaded model to a persistency format used by the metadata service. In at least some cases, it can be determined whether any artifact definitions depend on the updated model and, if so, such dependent models can be updated to provide new model versions.

For a function that compares two artifact definitions, including two versions of an artifact definition, information can be provided as to differences between the objects, how artifact definitions differ between different versions of a software component, or how artifact definitions differ between two versions of a system. Example input for comparing two versions of an artifact definition can include:
ObjectType
ObjectName
ObjectVersion1Id
ObjectVersion2Id
ChangeTypes [e.g., change types to be queries, such as all, insert, update, delete, unchanged]
ComparisionScope [e.g., all elements of an artifact definition, or only specified elements or sets of elements]
The comparison can return information including:
ObjectVersion
ChangeType
SubObjectType [e.g., field, association, parameter]
SubObjectName
PropertyType [e.g., active annotation, key, data type, name]
PropertyName
PropertyValue
The following can represent information in a request for changes in an artifact definition:
Input:
ChangeTypes=INSERT
ComparisonScope=ALL
The response can include:
Output:
ObjectVersion=2
ChangeType=INSERT
SubObjectType=FIELD
SubObjectName=NewField
Thus, the comparison request reveals that a new field, NewField, was introduced in object version 2 of the artifact definition.

An artifact exposure service or other functionality for accessing a metadata repository can be to return a list of objects where a particular metadata element is used. For example, a field may be initially defined for a particular table, but then may be referenced by multiple views. Input for this functionality can include:
Input:
ObjectType: Identification
ObjectName: Identification
ObjectVersionId: Identification
UseageTypes [e.g., ALL, association, target, data source, annotation)
MaximumNumberOfIndirections
The output of the request can include:
UsingObjectType
UsingObjectName
UsingObjectVersionId
UsageType
DirectlyUsedObjectType
DirectlyUsedObjectName
DirectlyUsedObjectName
DirectlyUsedObjectVersionId
NumberOfIndirections FIG. 21 provides an example of a "where used" request. A group 2104 of related artifact definitions includes an artifact definition 2108 for a View3 that references an artifact definition 2110 for a View2, which references an artifact definition 2112 for a View1, which in turn references an artifact definition 2114 for a Table1. Assuming that each of the views, 2108, 2110, 2112 references a field of Table1, and that the views refer to this field through their referenced views as shown, a request could be:
Input:
ObjectName: TABLE1
UseageTypes: ALL
MaximumNumberOfIndirections: 5
In response to the request, the information shown in table 2130 could be provided, either in tabular form as shown, or in another format.

For a dependency check, input (e.g., arguments to the function) can include:
ObjectType
ObjectName
ObjectSourceType
ObjectSourceContent
SoftwareComponentVersions
NewSoftwareComponentVersions
A response to the request (e.g., values returned by the function, such as in a structure (e.g., a C++ struct) or class instance, or another complex or abstract data type), can include:
MessageType [e.g, INFO, WARNING, ERROR]
MessageText
EntityReference [e.g., a link to additional details for the artifact definition, so that additional information regarding dependent objects can be identified]
As a particular example, consider that a new annotation, NewAnnotation, is added to a field ViewField, which is exposed by a user model. Output for a dependency check can include:
MessageType: INFO
MessageText: A new annotation NewAnnotation was added to the field ViewField
EntityReference= . . . /sap/opu/odata/sap/CdsMetadataService/ . . . NewAnnotation . . .

A service processing access to metadata can cause, or assist, in displaying metadata information to an end user, such on a user interface screen. The service can augment model metadata with additional information that can define the layout of the user interface, and can include or define additional services that allow a user to interact with the data. For example, annotations can be provided that assist a user in providing filter criteria via a value help, as shown in the example code of FIG. 22.

Example 17—Computing Systems

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing components of the environment 100 of FIG. 1, components of the environment 200 of FIG. 2, or the methods 300, 400 of FIGS. 3 and 4, including as described in Examples 1-16. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Cloud Computing Environment

Figure 24:
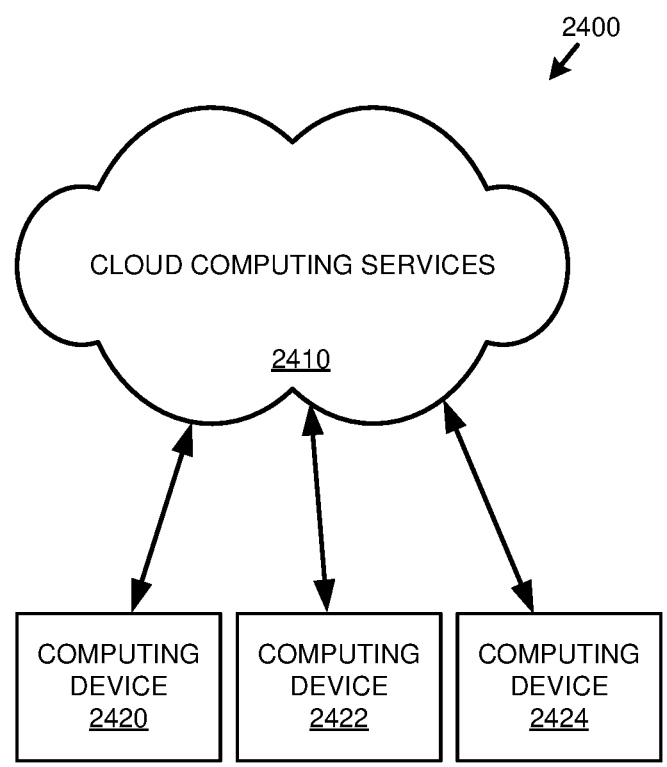
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 19—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    at least one hardware processor;
    at least one memory coupled to the at least one hardware processor; and
    one or more computer readable storage media storing computer-executable instructions that, when executed, cause the computing system to perform operations comprising:
        receiving a first data artifact, the first data artifact comprising a plurality of base elements and an extension comprising at least a first extension element;
        determining at least a second data artifact related to the first data artifact;
        analyzing the at least a first extension element for propagation to the at least a second data artifact;
        determining a number of content components of the first data artifact that are present in the at least a second data artifact;
        determining that the number of components satisfies a threshold;
        determining that at least one condition is satisfied for propagating the at least a first extension element to the at least a second data artifact, the at least one condition comprising the determining that the number of components satisfies the threshold; and
        based on determining that that at least one condition is satisfied for propagating the at least a first extension element to the at least a second data artifact, propagating the at least a first extension element to the at least a second data artifact.

2. The computing system of claim 1, wherein the analyzing the at least a first extension element comprises determining a type of the at least a first extension element and the determining that the at least one condition is satisfied comprises determining that the type is a type for which propagation is indicated.

3. The computing system of claim 1, wherein the analyzing the at least a first extension element comprises analyzing how the at least a second data artifact is related to the first data artifact.

4. The computing system of claim 3, wherein analyzing how the at least a second data artifact is related to the first data artifact comprises determining a number of elements of the first data artifact that are used by the at least a second data artifact.

5. The computing system of claim 4, wherein the threshold comprises two elements.

6. The computing system of claim 3, wherein analyzing how the at least a second data artifact is related to the first data artifact comprises determining if the at least a second data artifact uses an element of the first data artifact that is not a key field.

7. The computing system of claim 1, the operations further comprising:
  analyzing at least a second extension element of the first data artifact for propagation to the at least a second data artifact;
  determining that the at least a second extension element does not satisfy a condition for propagating the at least a second extension element to the at least a second data artifact; and
  not propagating the at least a second extension element to the at least a second data artifact.

8. The computing system of claim 7, wherein determining that the at least a second extension element does not satisfy a condition for propagating the at least a second extension element to the at least a second data artifact comprises determining that the at least a second extension element is of a type designated for non-propagation.

9. The computing system of claim 7, wherein determining that the at least a second extension element does not satisfy a condition for propagating the at least a second extension element to the at least a second data artifact comprises determining that the at least a second extension element is used with an operation that defines a selection of data.

10. The computing system of claim 7, wherein determining that the at least a second extension element does not satisfy a condition for propagating the at least a second extension element to the at least a second data artifact comprises determining that the at least a second extension element is used with an operation that defines a grouping of data.

11. The computing system of claim 7, wherein determining that the at least a second extension element does not satisfy a condition for propagating the at least a second extension element to the at least a second data artifact comprises determining that the at least a second extension element is used with an operation that defines an order in which data is presented or provided.

12. The computing system of claim 7, wherein determining that the at least a second extension element does not satisfy a condition for propagating the at least a second extension element comprises determining that the at least a second extension element is used in a formula.

13. The computing system of claim 1, the operations further comprising:
  determining that the at least a first extension element has an identifier that is the same as an identifier already used in the at least a second data artifact; and
  wherein propagating the at least a first extension element to the at least a second data artifact comprises renaming the at least a first extension element when used in the at least a second data artifact.

14. The computing system of claim 1, the operations further comprising:
  analyzing whether the first data artifact is user-defined artifact or a provider-defined artifact; and
  determining that the first data artifact is a provider-defined artifact, wherein the propagating is carried out based at least in part on the determining that the first data artifact is a provider-defined artifact.

15. The computing system of claim 1, the operations further comprising:
  determining at least a third data artifact that is related to the first data artifact; and
  carrying out the receiving, analyzing, and determining for the at least a third data artifact.

16. The computing system of claim 1, the operations further comprising:
  determining at least a third data artifact that is related to the first data artifact;
  determining that a user has access to the at least a third data artifact; and
  not carrying out the receiving, analyzing, and determining for the at least a third data artifact based at least in part on the determining that a user has access to the at least a third data artifact.

17. The computing system of claim 1, the operations further comprising:
  determining at least a third data artifact that is related to the first data artifact;
  determining that a user does not have access to the at least a third data artifact; and
  carrying out the receiving, analyzing, and determining for the at least a third data artifact based at least in part on the determining that a user does not have access to the at least a third data artifact.

18. The computing system of claim 1, the operations further comprising:
  displaying on a user interface an indication that the at least a first extension element is recommended for propagation to the at least a second data artifact; and
  receiving user input indicating that the at least a first extension element is selected for propagation, wherein the propagating is carried out in response to the receiving user input.

19. A method, implemented in a computing system comprising at least one memory and at least one hardware processor coupled to the at least one memory, the method comprising:
  receiving a first data artifact, the first data artifact comprising a plurality of base elements and an extension comprising at least a first extension element;
  determining at least a second data artifact related to the first data artifact;
  analyzing the at least a first extension element for propagation to the at least a second data artifact;
  determining a number of content components of the first data artifact that are present in the at least a second data artifact;
  determining that the number of components satisfies a threshold;
  determining that at least one condition is satisfied for propagating the at least a first extension element to the at least a second data artifact, the at least one condition comprising the determining that the number of components satisfies the threshold; and
  based on determining that that at least one condition is satisfied for propagating the at least a first extension element to the at least a second data artifact, and
  propagating the at least a first extension element to the at least a second data artifact.

20. One or more computer-readable storage media comprising:
  computer-executable instructions that, when executed by a computing system comprising at least one memory and at least one hardware processor coupled to the at least one memory, cause the computing system to receive a first data artifact, the first data artifact comprising a plurality of base elements and an extension comprising at least a first extension element;
  computer-executable instructions that, when executed by the computing system, cause the computing system to determine at least a second data artifact related to the first data artifact;

computer-executable instructions that, when executed by the computing system, cause the computing system to analyze the at least a first extension element for propagation to the at least a second data artifact;

computer-executable instructions that, when executed by the computing system, cause the computing system to determine a number of content components of the first data artifact that are present in the at least a second data artifact;

computer-executable instructions that, when executed by the computing system, cause the computing system to determine that the number of components satisfies a threshold;

determining that at least one condition is satisfied for propagating the at least a first extension element to the at least a second data artifact, the at least one condition comprising the determining that the number of components satisfies the threshold; and computer-executable instructions that, when executed by the computing system, cause the computing system to propagate the at least a first extension element to the at least a second data artifact.

\* \* \* \* \*